(12) United States Patent
Lukito

(10) Patent No.: US 10,801,634 B2
(45) Date of Patent: Oct. 13, 2020

(54) INTEGRATED FLOW CONTROL VALVE WITH FLOWRATE FEEDBACK

(71) Applicant: Fluid Power Control Systems, Inc., Fullerton, CA (US)

(72) Inventor: Harsoyo Lukito, Placentia, CA (US)

(73) Assignee: Fluid Power Control Systems,, Inc., Fullerton, CA (US)

( * ) Notice: Subject to any disclaimer, the term of this patent is extended or adjusted under 35 U.S.C. 154(b) by 0 days.

(21) Appl. No.: 16/517,084

(22) Filed: Jul. 19, 2019

(65) Prior Publication Data

US 2019/0353264 A1  Nov. 21, 2019

Related U.S. Application Data

(63) Continuation-in-part of application No. 15/405,007, filed on Jan. 12, 2017, now Pat. No. 10,359,126, which is a continuation-in-part of application No. 15/013,849, filed on Feb. 2, 2016, now Pat. No. 9,733,111.

(51) Int. Cl.
*F16K 31/22* (2006.01)
*F16K 21/18* (2006.01)
*F16K 31/06* (2006.01)
*G01F 25/00* (2006.01)

(52) U.S. Cl.
CPC ........ *F16K 21/185* (2013.01); *F16K 31/0641* (2013.01); *G01F 25/0069* (2013.01)

(58) Field of Classification Search
CPC ........ F16K 31/22; F16K 27/003; F16K 31/06; F16K 37/0041; F16K 21/185; F16K 31/0641; G01F 25/0069
See application file for complete search history.

(56) References Cited

U.S. PATENT DOCUMENTS 2,350,343 A * 6/1944 Fischer ...................... 73/861.57
4,489,614 A * 12/1984 deFasselle ................ G01F 1/24
 73/861.54

* cited by examiner

*Primary Examiner* — P. Macade Nichols
(74) *Attorney, Agent, or Firm* — Raymond Sun

(57) ABSTRACT

A flow control valve assembly has at least one manifold having an inlet flow port, an outlet flow port, and a flow channel provided there between, the flow channel having an inlet chamber, a variable area chamber and an outlet chamber, with fluid flowing from the inlet flow port to the inlet chamber, the variable area chamber and the outlet chamber, in that order, before exiting the outlet flow port. The flow control valve assembly further includes a float assembly having a float extending through the flow channel and which is limited for its movement inside the variable area chamber, a connecting rod extending through the flow channel and which has an upper end that is connected to the float and a lower end that is connected to a magnet. A measuring device is positioned outside the fluid chamber at the bottom of the at least one manifold, and spaced apart from the magnet.

10 Claims, 30 Drawing Sheets

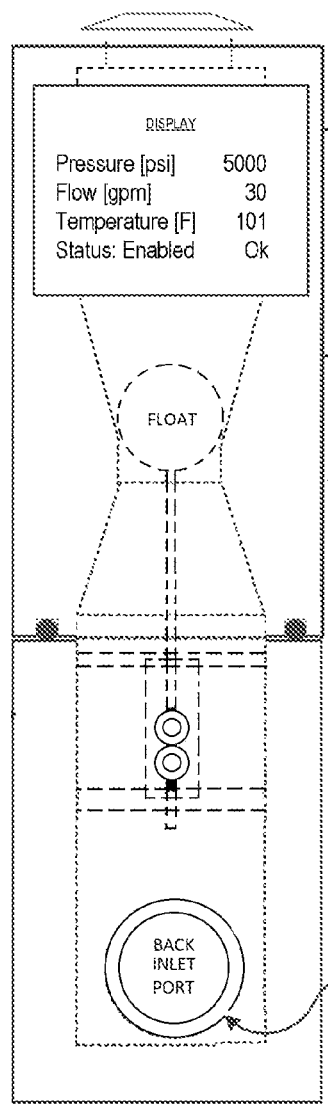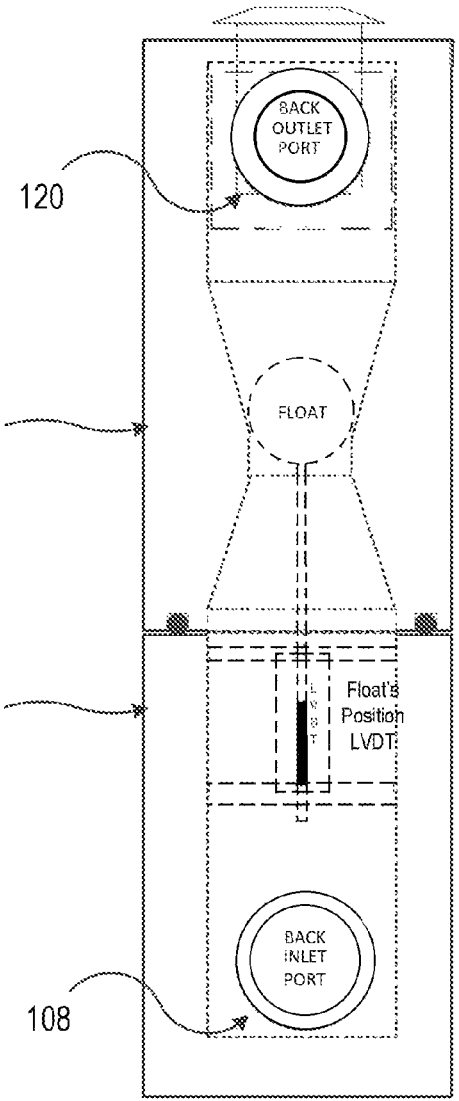
Fig. 5  Fig. 6

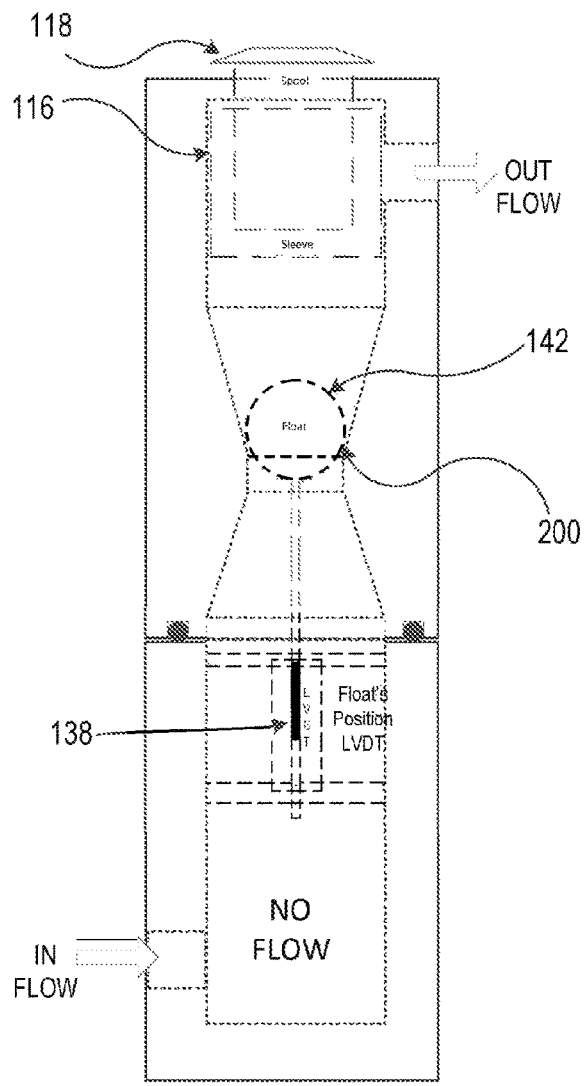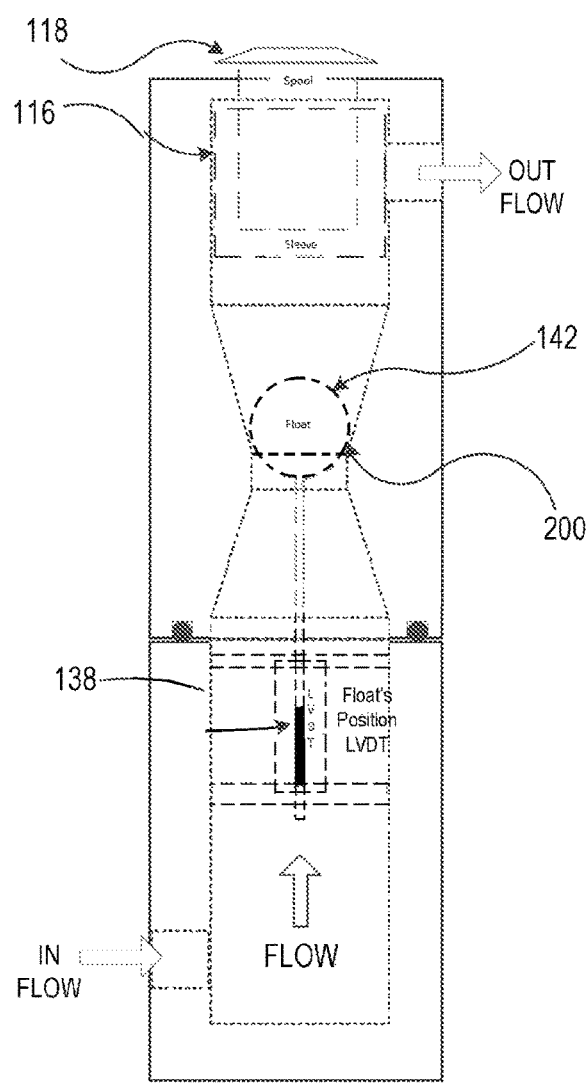
Fig. 13A
Fig. 13B

INTEGRATED FLOW CONTROL VALVE WITH FLOWRATE FEEDBACK

BACKGROUND OF THE INVENTION

1. Field of the Invention

The present invention relates to the control and measurement of flowrates for fluids, and in particular, to an assembly for controlling and measuring or sensing the flowrate of fluids.

2. Description of the Prior Art

A rotameter is a well-known device that measures the flowrate of fluid in a closed tube. It belongs to a class of meters called variable area meters, which measure flowrate by allowing the cross-sectional area of the fluid traveling through, to vary, causing a measurable effect. Unfortunately, rotameters cannot be used to measure flowrate at high pressures because they are typically made out of glass.

There are also other techniques and devices to measure flowrates, for example, turbine meters and venturi tubes (delta P). However, these devices do not accurately measure flowrates at the low end (e.g., turn-down ratios below 20-to-1) of the flow.

Thus, there remains a need to provide a device for accurately measuring fluid flowrates, even at high pressures.

SUMMARY OF THE DISCLOSURE

In order to accomplish the objects of the present invention, there is provided a flow control valve assembly having at least one manifold having an inlet flow port, an outlet flow port, and a flow channel provided between the inlet flow port and the outlet flow port, the flow channel having an inlet chamber, a variable area chamber and an outlet chamber, with fluid flowing from the inlet flow port to the inlet chamber, the variable area chamber and the outlet chamber, in that order, before exiting the outlet flow port. The flow control valve assembly further includes a float assembly having a float extending through the flow channel and which is limited for its movement inside the variable area chamber, a connecting rod extending through the flow channel and which has an upper end that is connected to the float and a lower end that is connected to a magnet. A measuring device is positioned at the bottom of the at least one manifold, and spaced apart from the magnet.

BRIEF DESCRIPTION OF THE DRAWINGS

FIG. 5 is a front view of the assembly of FIG. 4.

FIG. 6 is a rear view of the assembly of FIG. 4.

FIG. 13A is a sectional view illustrating the float in a rest position.

FIG. 13B is a sectional view illustrating the float being displaced from the rest position during fluid flow.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

Figure 1A:
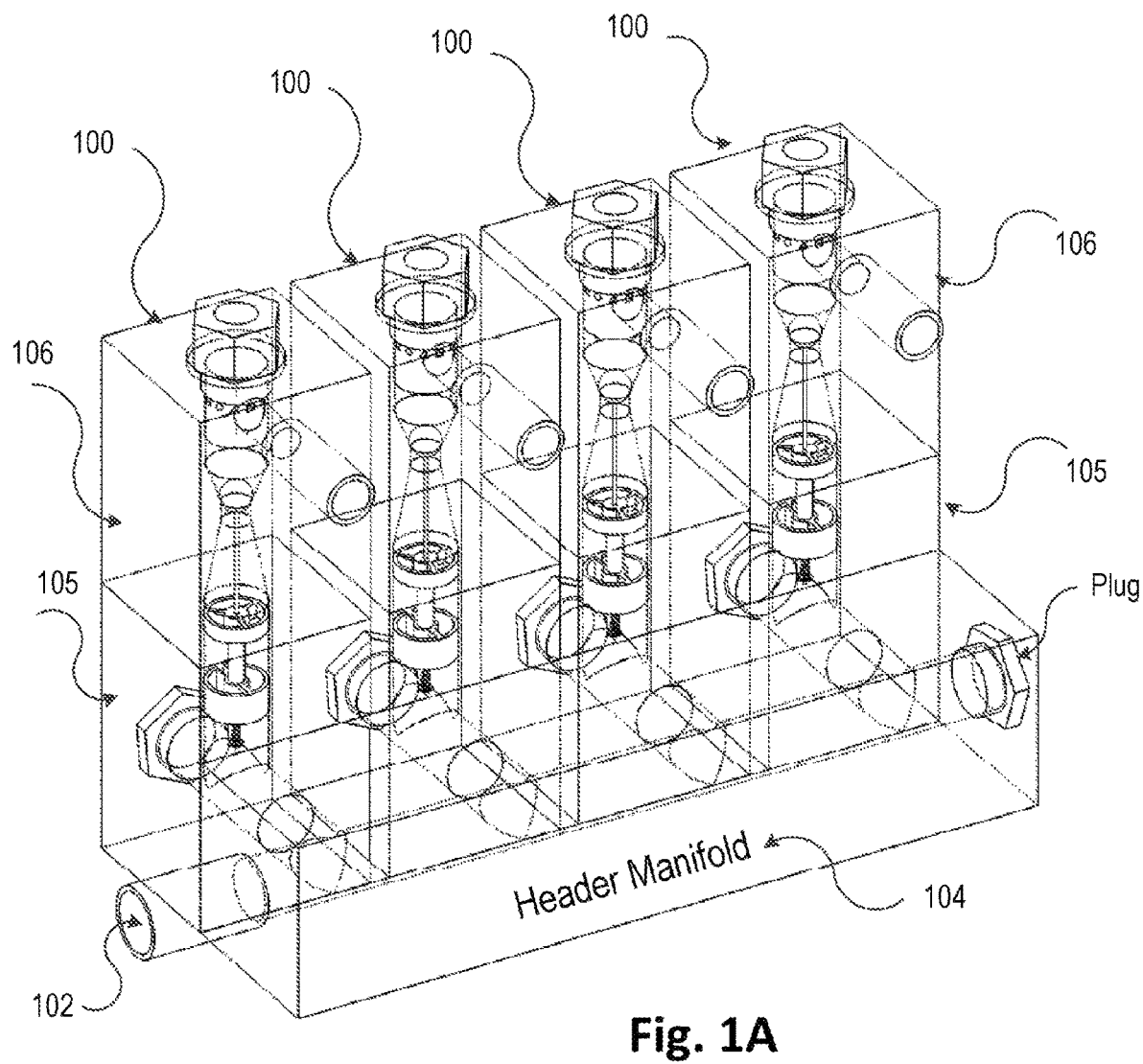
FIG. 1A is a perspective view of a flow control valve assembly according to one embodiment of the present invention shown in use with multiple output flow channels.
Figure 1B:
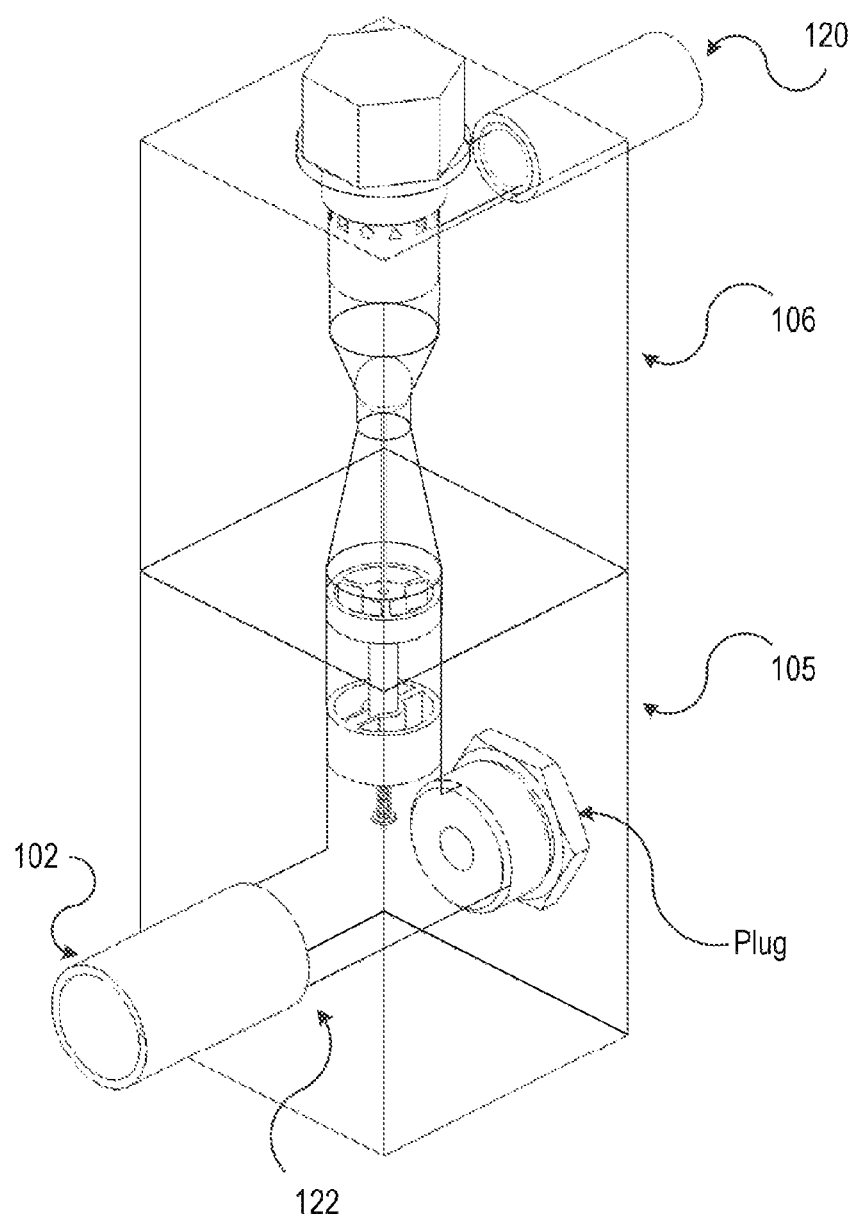
FIG. 1B is a perspective view of a flow control valve assembly according to another embodiment of the present invention shown in use with a single output flow channel, with the inlet flow port on the opposite side of the outlet flow port.
Figure 1C:
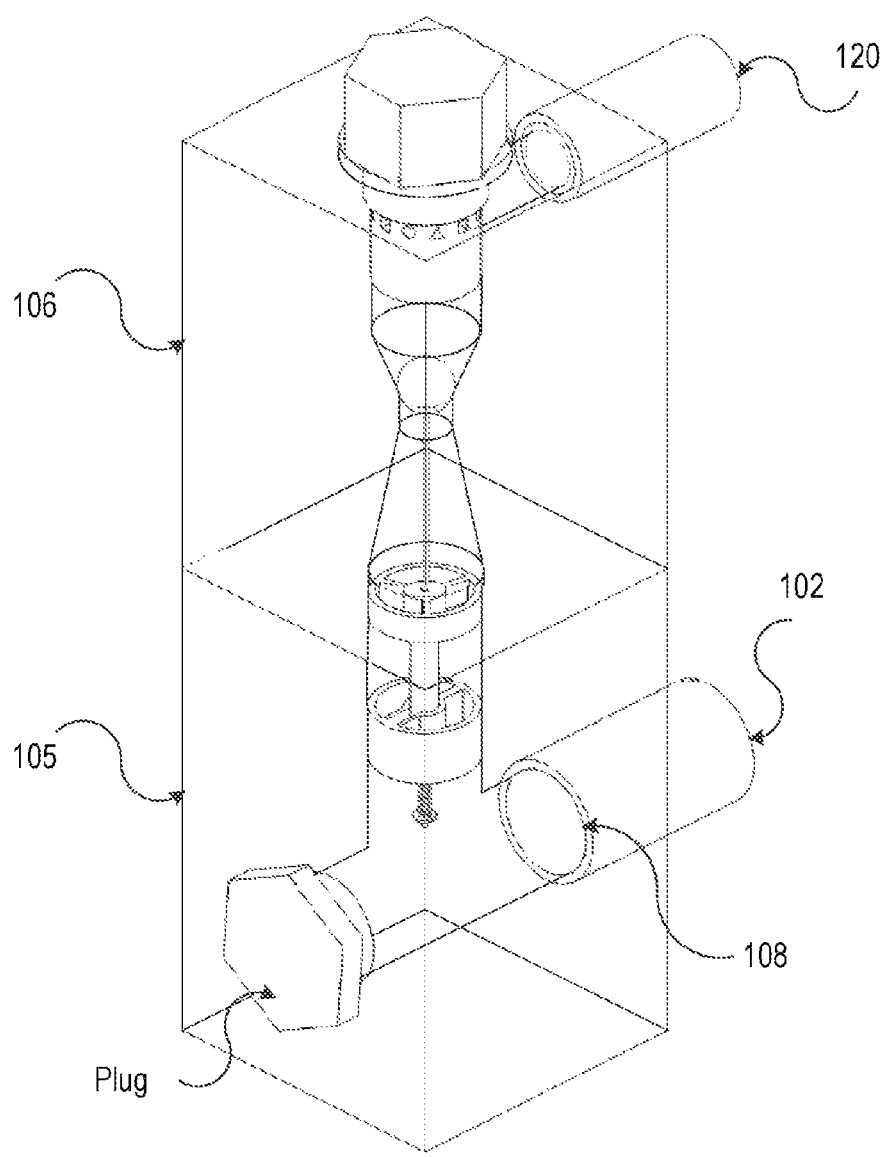
FIG. 1C is a perspective view of a flow control valve assembly according to another embodiment of the present invention shown in use with a single output flow channel, with the inlet flow port on the same side as the outlet flow port.

FIGS. 1A, 1B, and 1C illustrate the flow control valve assembly 100 as used in an application for multiple output flow channels (FIG. 1A) and a single output flow channel (FIGS. 1B and 1C). There are two ports 108 and 122 that can be used as an inlet flow port and can be fluidly coupled with a header manifold for multiple outlet flows. The unused port can be plugged or used with a pressure control circuit, which controls the inlet flow pressure.

Referring to FIG. 1A, inlet flow is delivered via an inlet flow tube 102 into a header manifold 104 for distributing the inlet flow, and to which each flow control valve assembly 100 is fluidly coupled. For example, referring to FIGS. 2 and 3, each assembly 100 has a feedback manifold 105 and a flow control manifold 106. Each feedback manifold 105 has an inlet flow port 108 which is fluidly coupled to inlet flow in the header manifold 104. The inlet flow port 108 is coupled to an inlet chamber 110 having PQT (Pressure, Flowrate, and Temperature) transducers in the feedback manifold 105. The inlet chamber 110 is in turn fluidly coupled to a variable area chamber 112 in the flow control manifold 106, and then the variable area chamber 112 is fluidly coupled to an outlet chamber 114.

Figure 12:
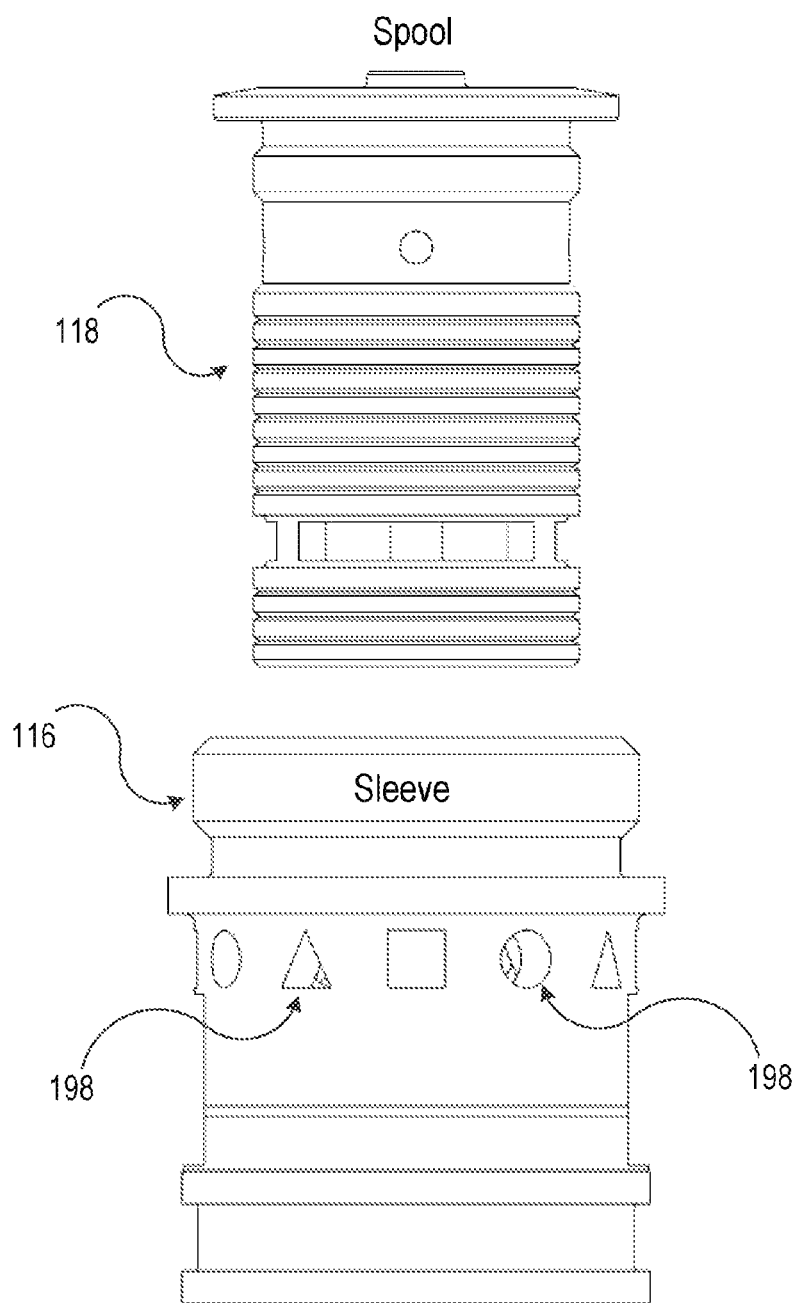
FIG. 12 is an exploded view of a valve sleeve and valve spool that can be used with the assembly of FIGS. 1A, 1B and 1C.

A valve sleeve 116 and a matching valve spool 118 are seated inside the outlet chamber 114 to control the flow of the outflowing fluid. The valve sleeve 116 has configurable orifices 198 as shown in FIG. 12. The valve spool 118, controlled by the actuator 190, moves relative to the valve sleeve 116 to control the overall outflow orifice area, which in turn controls the flowrate. An outlet flow port 120 is fluidly coupled to the outlet chamber 114 through the valve spool 118 and valve sleeve 116 to allow the fluid to flow to the outflow path. The outflow orifice area concept includes providing, strategically positioning, and sizing multiple hole or orifice arrangements in the valve sleeve 116 to meter the desired flowrate.

An actuator 190, typically a solenoid driven, can be coupled to the valve spool 118 to drive the desired spool position. An optional actuator position feedback 192 (e.g., an LVDT) can also be coupled to the actuator 190 for providing feedback of the actuator position.

Figure 4:
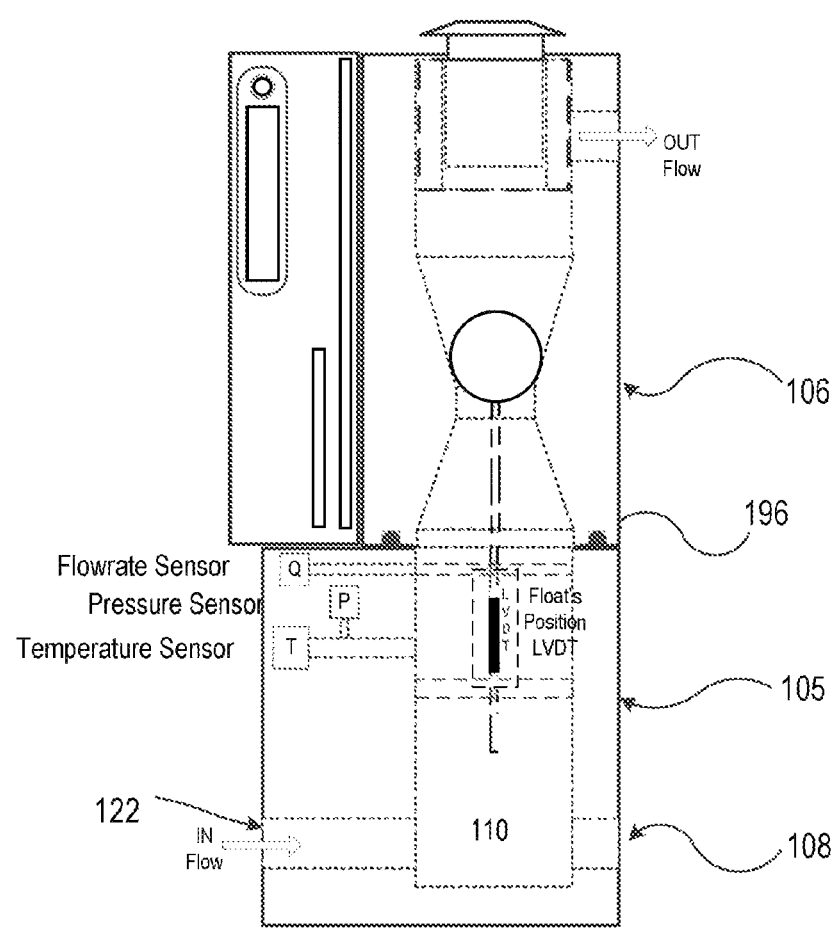
FIG. 4 is a cross-sectional side view of the assembly of FIG. 1B adapted for use with a single output flow channel.

Referring to FIGS. 4-6, for the single output flow channel embodiments shown in FIGS. 1B and 1C, the inlet flow is coupled directly to the inlet flow port 108 of the feedback manifold 105.

Figure 7:
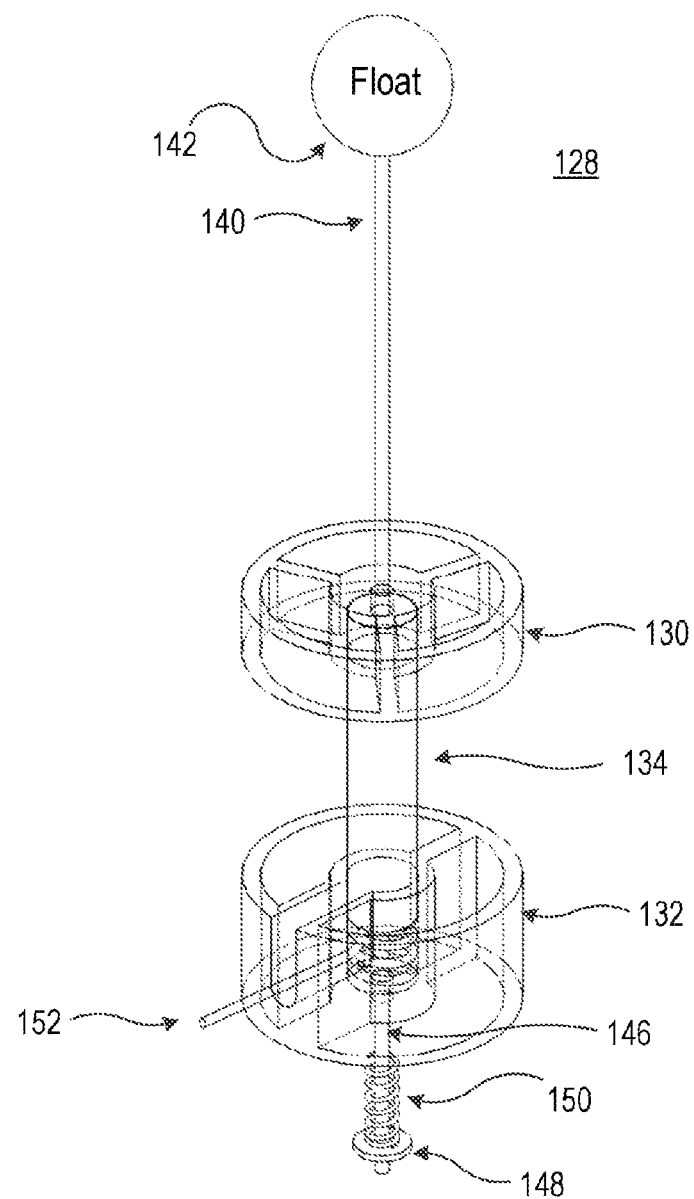
FIG. 7 is a perspective view of the float assembly of the assembly of FIGS. 1A, 1B, and 1C shown with a compression spring.

Referring back to FIGS. 2 and 3, the feedback manifold 105 includes the electronics and sensors for measuring Pressure, Flowrate, and Temperature. The LVDT sensor wires are channeled from the inlet chamber 110 to the electronic enclosure 180 (dry area). The LVDT sensor wires are protected against the fluid flow by either upper mounting bracket 130 or lower mounting bracket 132 depending on how the LVDT 134 is orientated. In addition, a pressure control circuit can be built-in to the feedback manifold 105 to control the specific inlet flow pressure. A similar pressure control circuit can be incorporated with the header manifold 104 to control the common inlet flow pressure. The inlet chamber 110 has a generally cylindrical configuration and is adapted to receive the upper mounting bracket 130 and the lower mounting bracket 132 of the float assembly 128 of FIG. 7.

Figure 8:
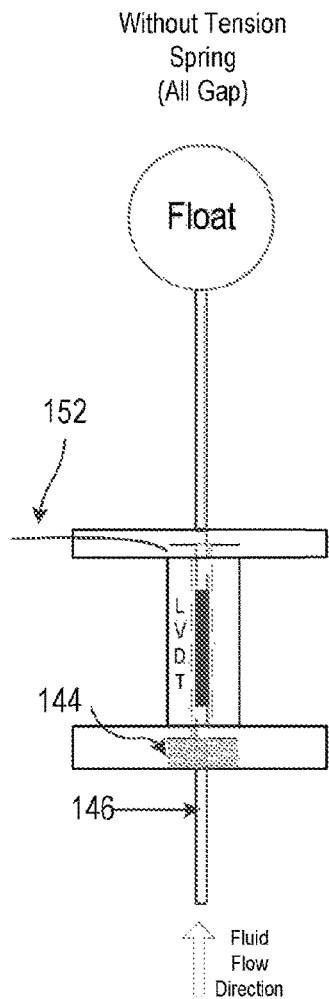
FIG. 8 is a side view of the float assembly of FIG. 7 shown without a compression spring.
Figure 9:
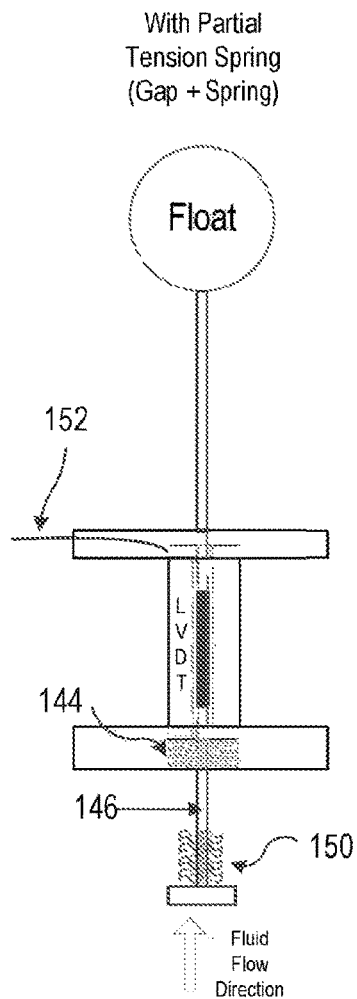
FIG. 9 is a side view of the float assembly of FIG. 7 shown with a partial compression spring.
Figure 10:
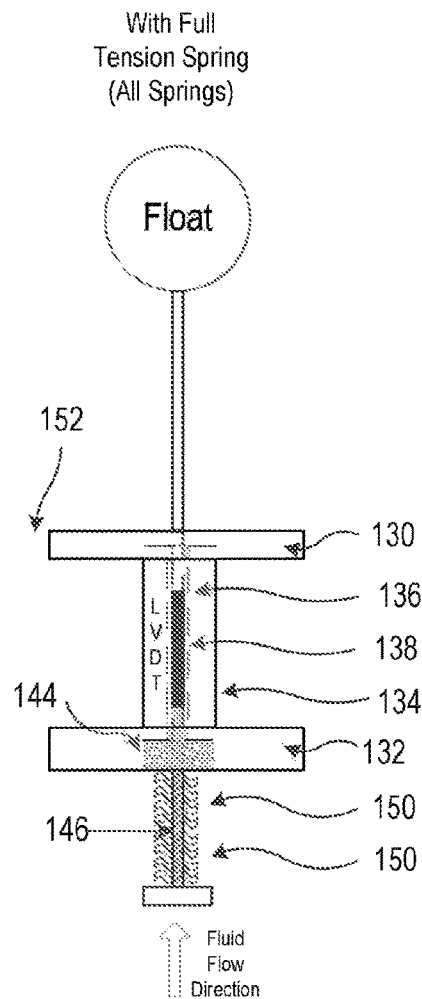
FIG. 10 is a side view of the float assembly of FIG. 7 shown with a full compression spring.
Figure 11A:
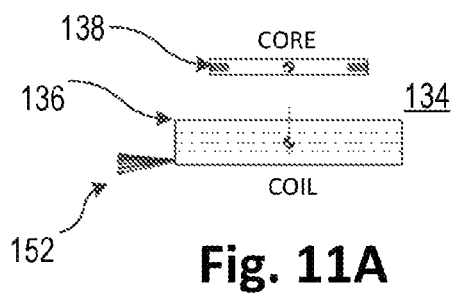
FIG. 11A is an exploded sectional view of a conventional linear variable differential transformer (LVDT).

Referring to FIGS. 7-10, the float assembly 128 includes an LVDT 134 which has opposite ends retained by the upper mounting bracket 130 and the lower mounting bracket 132. Referring also to FIG. 11A, the LVDT 134 has a coil assembly 136 and a core 138. The core 138 has a cylindrical bore extending therethrough, with a connecting rod 140 having a lower end extending through an upper part of the bore of the LVDT 134. A float 142 is secured to the upper end of the connecting rod 140. A mounting spring 144 is provided on the lower mounting bracket 132 to provide support to the coil assembly 136, to absorb vibrations, and to take out slack. An extension rod 146 extends from a lower part of the cylindrical bore of the core 138, and terminates at a stop 148. An extension rod spring 150 is provided on the extension rod 146 between the stop 148 and the lower mounting bracket 132. In FIG. 8, the extension rod spring 150 is not shown and is therefore omitted. In FIG. 9, the extension rod spring 150 is provided as a partial spring. In FIG. 10, the extension rod spring 150 is provided as a full spring. The purpose of the extension rod springs 150 is to shorten the float's 142 travel. A full spring could be comprised of multiple springs, each with different compression values, and these added springs must be included as a part of the balanced energy equation.

Figure 11B:
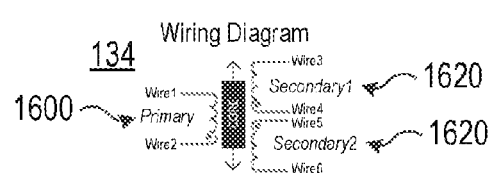
FIG. 11B is an electrical diagram for the LVDT of FIG. 11A.

The LVDT 134 is used to measure the displacement or movement of the float 142. As shown in FIG. 11B, the coil assembly 136 consists of a primary winding 1600 centered between a pair of identically wound secondary windings 1620 that are symmetrically spaced about the primary winding 1600. The coils are typically wound on a one-piece hollow form of thermally stable glass reinforced polymer, encapsulated against moisture, wrapped in a high permeability magnetic shield, and then secured in a cylindrical stainless steel housing. The coil assembly 136 is usually the stationary element of the LVDT, with the core 138 being the moving element. The core 138 can be a separate tubular armature of magnetically permeable material, which is free to move axially within the hollow bore defined by the coil assembly 136. The core 138 is connected to the float 142 via the connecting rod 140. In operation, the primary winding 1600 is energized by alternating current of appropriate amplitude and frequency. The LVDT's electrical output signal is the differential AC voltage between the two secondary windings 1620, which varies with the axial position of the core 138 within the coil assembly 136. In the present invention, the wires of the coil assembly 136 are in a high pressure flow channel (wet) and they are subjected to fluid flow velocity as high as 30 feet per second. The mounting brackets 130 and 132 are designed to protect the signal wires 152 (see FIG. 7) from fluid flow velocity.

The float 142 can be configured in any shape and is used to measure the fluid flowrate using the rotameter or variable orifice area concept when mounted without spring compression. The density of the float 142 must be greater than the fluid density if a compression spring is not added. If an extension rod spring 150 is added in compression (see below), the density of the float 142 can be greater or less than the fluid density, but the flowrate computation must include the spring forces along its axis.

The mounting brackets 130 and 132 are mounted adjacent the upper end of the inlet chamber 110, and provide a solid stop or securement mechanism for the LVDT 134 to prevent the coil assembly 136 from moving during fluid flow. Signal wires 152 are coupled to the core 138 and are channeled through either the upper mounting bracket 130 or the lower mounting bracket 132 in a protective mode.

The connecting rod 140 and the extension rod 146 should not be made of magnetized, ferromagnetic, or high conductivity metals, but instead can be made of plastic or other non-conducting materials. One example is an AISI 300 series austenitic (non-magnetic) stainless steel which prevents distortion of the LVDT magnetic field.

The extension rod spring 150 allows the size of the manifolds 105 and 106, and their chambers 110, 112 and 114, to be minimized. This can be important where space is limited. The extension rod spring 150 functions to limit the displacement of the float 142 while achieving the same flowrate. However, the flowrate computation must include the spring force along its axis.

The present invention uses the principles (and equations) of conservation of energy to balance the float 142, and the continuity equation to compute the flowrate. The position of the float 142 is detected by the LVDT 134 in the form of its actual displacement from its rest position (see FIG. 13A) which is a reference point, and then the LVDT 134 calculates the flow opening area 200 or variable orifice area (see FIG. 13B), which is actually the circumferential space between the tapered wall and the ball of the float 142. The position of the float 142, measured by the LVDT 134, defines the flowrate. At any float position, the total summation of forces acting on the float 142 is balanced.

$$\Sigma Fy = Fd + Fb - W + / - Fs + Fm = 0$$

where Fy is the vertical force, Fd is the drag force, Fb is the buoyancy force, W is the weight of the float 142, Fs is the spring force in tension/compression, and Fm are the miscellaneous forces which are negligible.

The fluid energy equation is: $\frac{1}{2} * v^2/g + Z + P/(\rho * g) = $ Constant at any point of reference
where v is the fluid velocity, g is the gravity constant, Z is the potential energy, P is the pressure, and p is the density of the fluid.

The continuity equation is: Flow $Q = v_a * A_a = v_b * A_b$,
where $A_a$ is the flow area at the inlet of the neck region 162, $A_b$ is the flow opening area 200 around the float 142, $v_a$ is the fluid velocity at the inlet of the neck region 162 and $v_b$ is the fluid velocity at the flow opening area 200 around the float 142.

Referring back to FIG. 2, the variable area chamber 112 of the flow control manifold 106 has a tapered inflow section 160, a neck region 162, and a tapered outflow section 164. The tapered inflow section 160 starts with its largest diameter at the bottom of the flow control manifold 106 where the fluid flow enters the variable area chamber 112 from the inlet chamber 110, and then gradually tapers to its smallest diameter where it transitions to the neck region 162, and then the variable area chamber 112 transitions from the neck region 162 to the tapered outflow section 164 which starts with its smallest diameter at the transition from the neck region 162 and gradually tapers to its largest diameter adjacent the transition to the outlet chamber 114. The outlet chamber 114 has a generally cylindrical configuration and is adapted to receive the valve spool 118 and the valve sleeve 116.

The float 142 is retained in the tapered outflow section 164 and adapted to rest on the neck region 162 when there is no fluid flow. The connecting rod 140 extends through the neck region 162 and through the tapered inflow section 160 to the LVDT 134 that is retained in the inlet chamber 110.

The inward taper in the tapered inflow section 160 is designed to increase the velocity of the fluid at the location of the neck region 162, where the float 142 is located. The increased velocity will increase the kinetic energy of the fluid entering the neck region 162. Once the float 142 is lifted or moving, it will reach an equilibrium point, where the energy on the float 142 is balanced. The outward taper of the tapered outflow section 164 creates an increasing or variable flow area, thus decreasing the velocity of the fluid, and functions to limit the distance travelled by the float 142.

As a result, energy is conserved at any position occupied by the float 142. In this application, the major forces acting on the float 142 are: (i) the weight of the float 142, (ii) the buoyancy force from the fluid, (iii) the fluid pressure acting upon the cross-sectional area of the float 142 or drag force, and (iv) the spring force if applicable. Other forces are assumed to be negligible. When there is no flowrate, the float 142 rests at the bottom of the tapered outflow section 164 at the neck region 162 (the "rest" position). This is the reference point of the measurement taken by the LVDT 134. At this point, the weight and buoyancy forces are being balanced by the normal force (action is equal to reaction) at the tapered outflow section 164. When there is a flowrate, the float 142 will be raised to a certain position in the tapered outflow section 164 away from the neck region 162, which is detected or measured by the LVDT 134. At any float position other than the rest position, the weight and buoyancy forces are balanced by the fluid pressure acting on the cross-sectional area of the float 142 or drag force, and spring force, if applicable. The continuity equation mentioned above applies to all float positions; that is, the mass or volume flow "in" must equal the mass or volume flow "out". In other words, flowrate IN=flowrate OUT.

A separate display and electronic enclosure 180 can be remotely secured or coupled to the flow control manifold 106. The electronic enclosure 180 can include a housing, with a signal conditioner circuit board 184 and a main controller and driver circuit board 186 housed therein. An operator interface and display 188 can also be integrated into the housing, and possibly mounted on a tiltable panel.

The manifolds 105 and 106 are illustrated as being embodied in separate units or housings, but these manifolds 105 and 106 can be combined into a single housing. In the embodiment illustrated in FIGS. 2 and 3, the manifolds 105 and 106 are separate, and an O-ring 196 can be provided at the connection between the manifolds 105 and 106 to provide an effective fluid seal. One aspect of the present invention is that the various components (manifolds 104, 105 and 106, and display and electronic enclosure 180) can be provided in separate modules and then assembled together on a modular basis. The modularity of these components allows the end user to have options to use differently-sized or differently-calibrated components with different applications.

A number of applications lend themselves to be used by the present invention. For example, the flow control valve assembly 100 is effective in controlling output flowrate to meet the requirements of any given application, such as controlling the velocity or speed of an actuator. Other examples include use to:

limit output flowrate for a specific channel (e.g., controlling chilled or heated fluid flowrate for precision heating or cooling);

limit output flowrate for multiple channels (e.g., for flow distributions which are comparable to an electrical distribution panel);

split or divide an inlet flow to meet a specific flow ratio requirement (e.g., gas engine application); or combine multiple inlet flow channels into one for accurate mixing (e.g., precision chemical fluid mixings).

The flow control valve assembly 100 is illustrated herein as being mounted vertically during use (e.g., see FIGS. 1A, 1B and 1C), but it can also be mounted horizontally. The difference between the two orientations is that the extension rod spring 150 is optional with the vertical orientation, but the spring 150 would be required if the assembly 100 is mounted horizontally.

FIGS. 14-18 illustrate a float assembly 210 according to another embodiment of the present invention. Both the float assemblies 128 and 210 perform the same function of measuring the displacement of the float using an LVDT 134 or similar measurement device, but the float assembly 210 has a simpler construction that also isolates the LVDT coils from the fluid pressure, and isolates electrical cables from the fluid flow, so that only the core 138 of the LVDT 134 is exposed to the fluid pressure.

Figure 16:
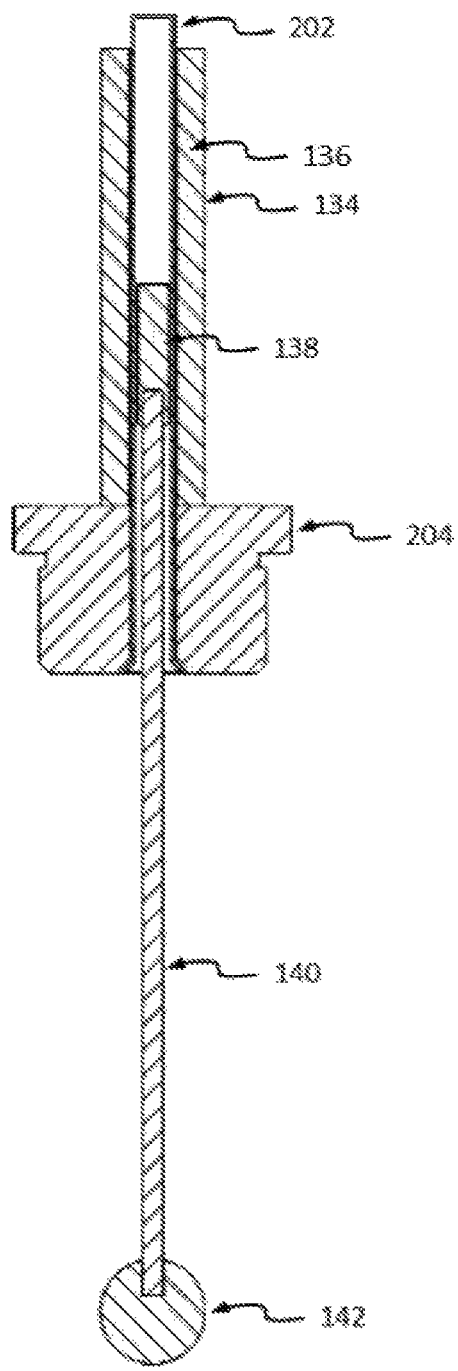
FIG. 16 is a cross-sectional side view of the float assembly of FIG. 14 shown without a compression spring.
Figure 17:
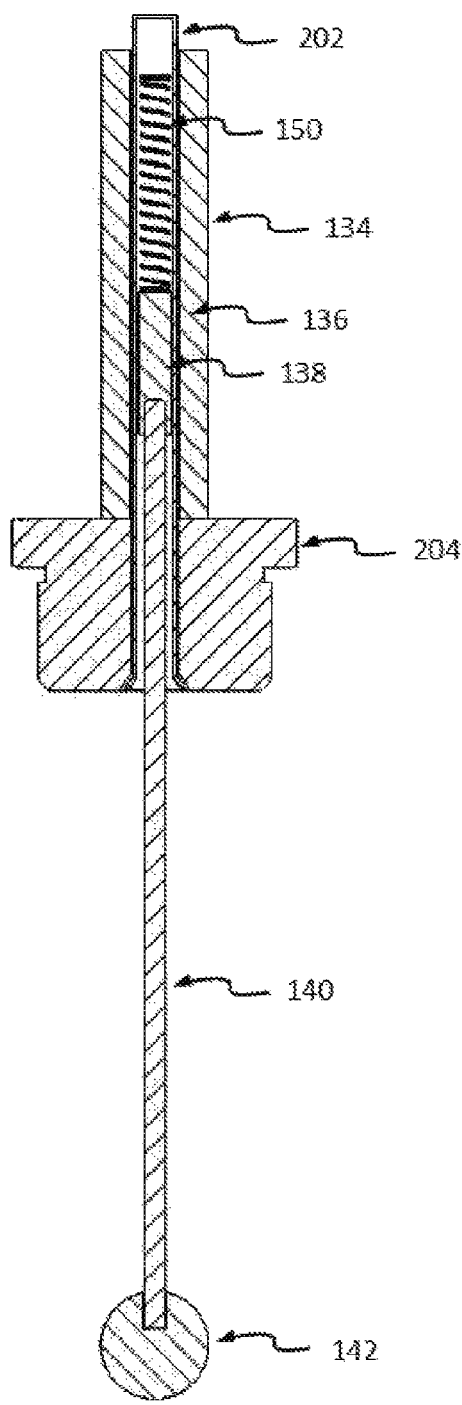
FIG. 17 is a cross-sectional side view of the float assembly of FIG. 14 shown with a partial compression spring.

Referring to FIGS. 14 to 18, the float assembly 210 includes an LVDT 134 that has a coil assembly 136 and a core 138. The LVDT 134 is positioned above a fitting 204. The fitting 204 has a platform 206 and a body 208 below it, with the platform 206 defining a wider diameter than the body 208 with a flange extending from the top of the body 208. A channel 220 extends through the center of the body 208 and the platform 206. The LVDT 134 has a channel 212 that extends through its longitudinal axis, and the channel 212 is aligned with the channel 220 of the fitting 204. A tube 202 extends through the channels 220 and 212 as best shown in FIG. 17. An extension rod spring 150 is retained inside the bore 214 of the tube 202, on top of the core 138 of the LVDT 134. The core 138 also has a cylindrical bore extending through a lower part of the core 138, with a connecting rod 140 having an upper end extending through the bore in the lower part of the core 138. A float 142 is secured to the lower end of the connecting rod 140, with the connecting rod 140 extending through a portion of the bore 214 of the tube 202 to reach the core 138.

Figure 18:
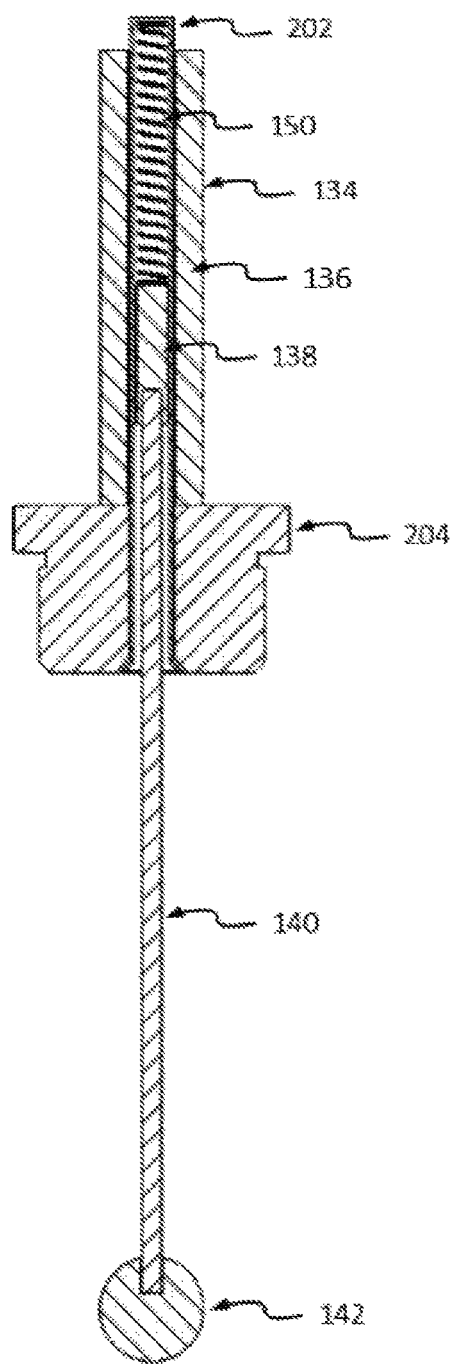
FIG. 18 is a cross-sectional side view of the float assembly of FIG. 14 shown with a full compression spring.

FIGS. 16, 17 and 18 correspond to FIGS. 8, 9 and 10, respectively. Specifically, in FIG. 16, the extension rod spring 150 is not shown and is therefore omitted. In FIG. 17, the extension rod spring 150 is provided as a partial spring. In FIG. 18, the extension rod spring 150 is provided as a full spring. The purpose of the extension rod springs 150 in FIGS. 16-18 are the same as explained above for FIGS. 8-10.

Figure 2:
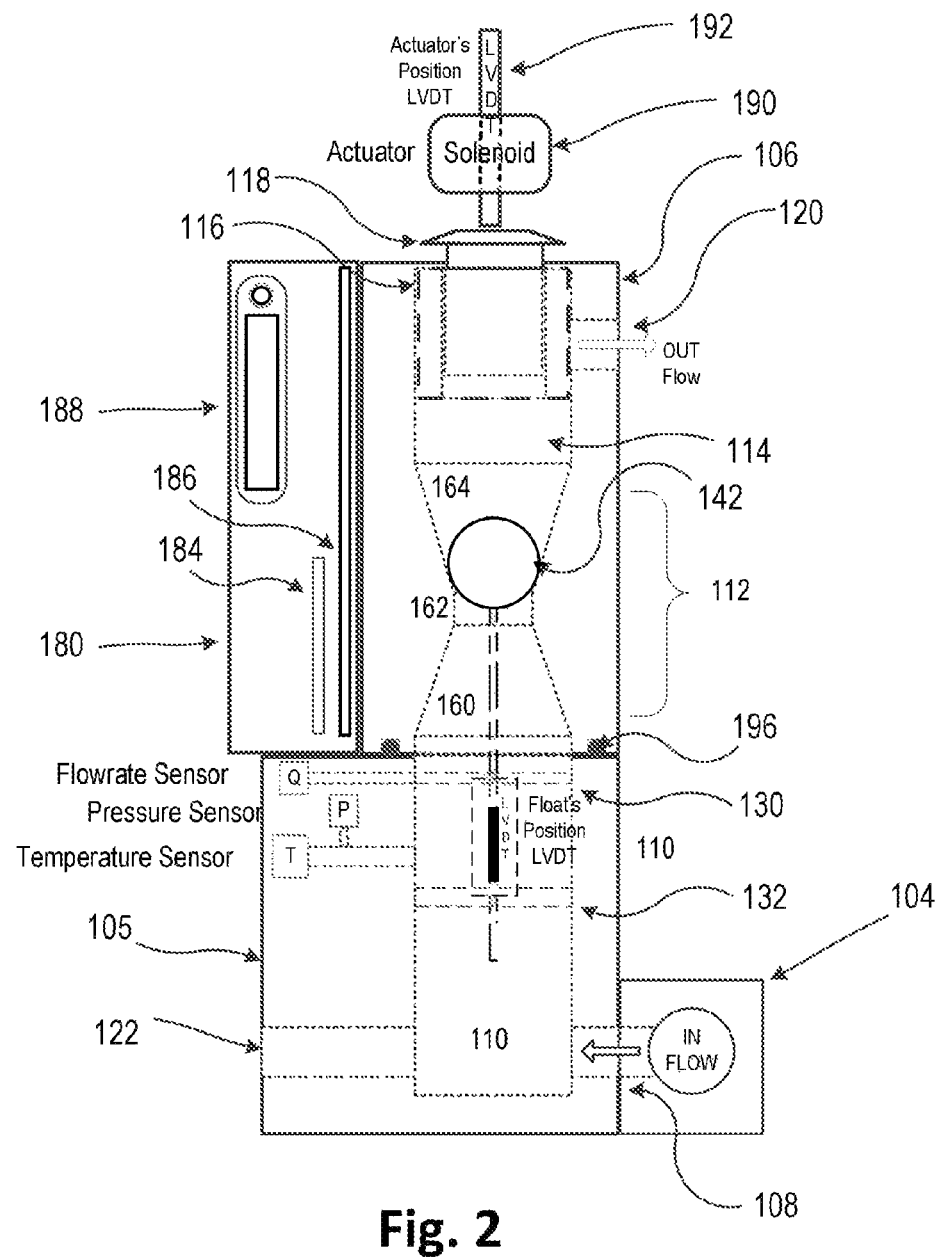
FIG. 2 is a cross-sectional side view of the assembly of FIG. 1A adapted for use with multiple output flow channels.
Figure 3:
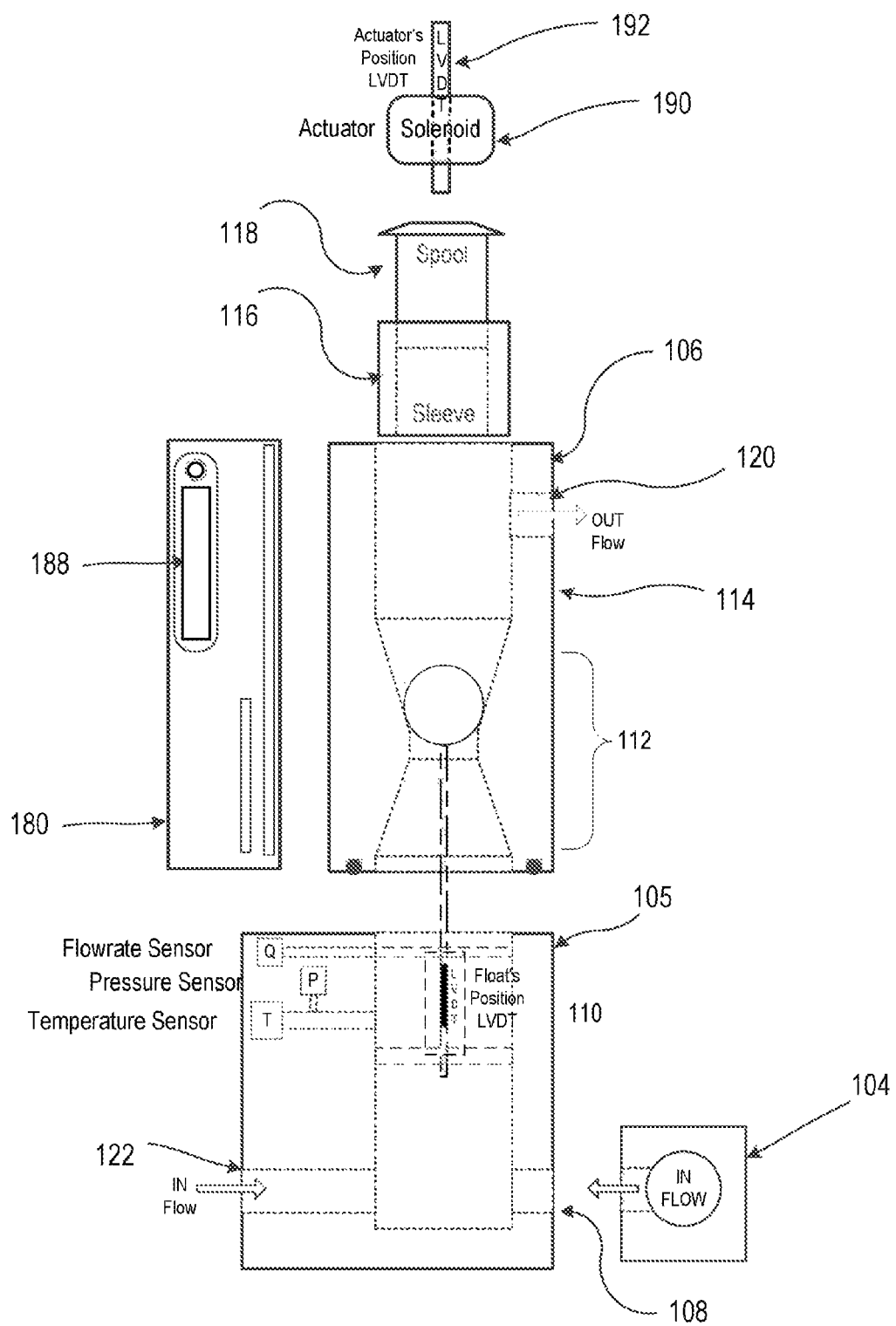
FIG. 3 is an exploded view of the assembly of FIG. 2.
Figure 14:
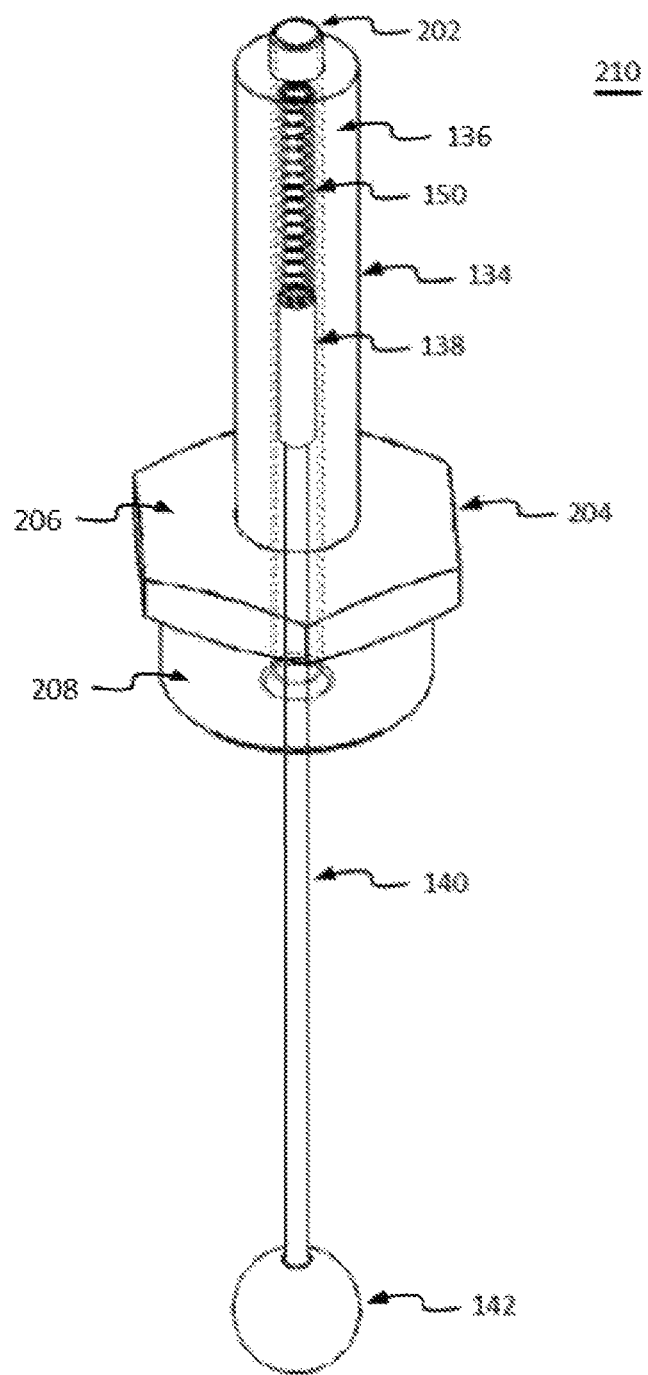
FIG. 14 is a perspective view of a float assembly according to another embodiment of the present invention shown with a compression spring.
Figure 15:
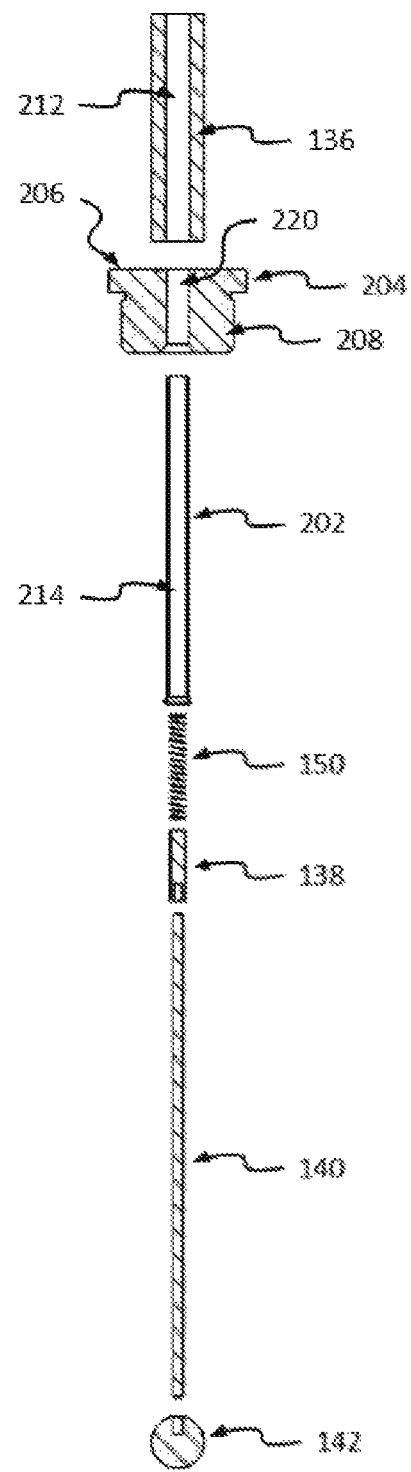
FIG. 15 is an exploded side view of the float assembly of FIG. 14.
Figure 19:
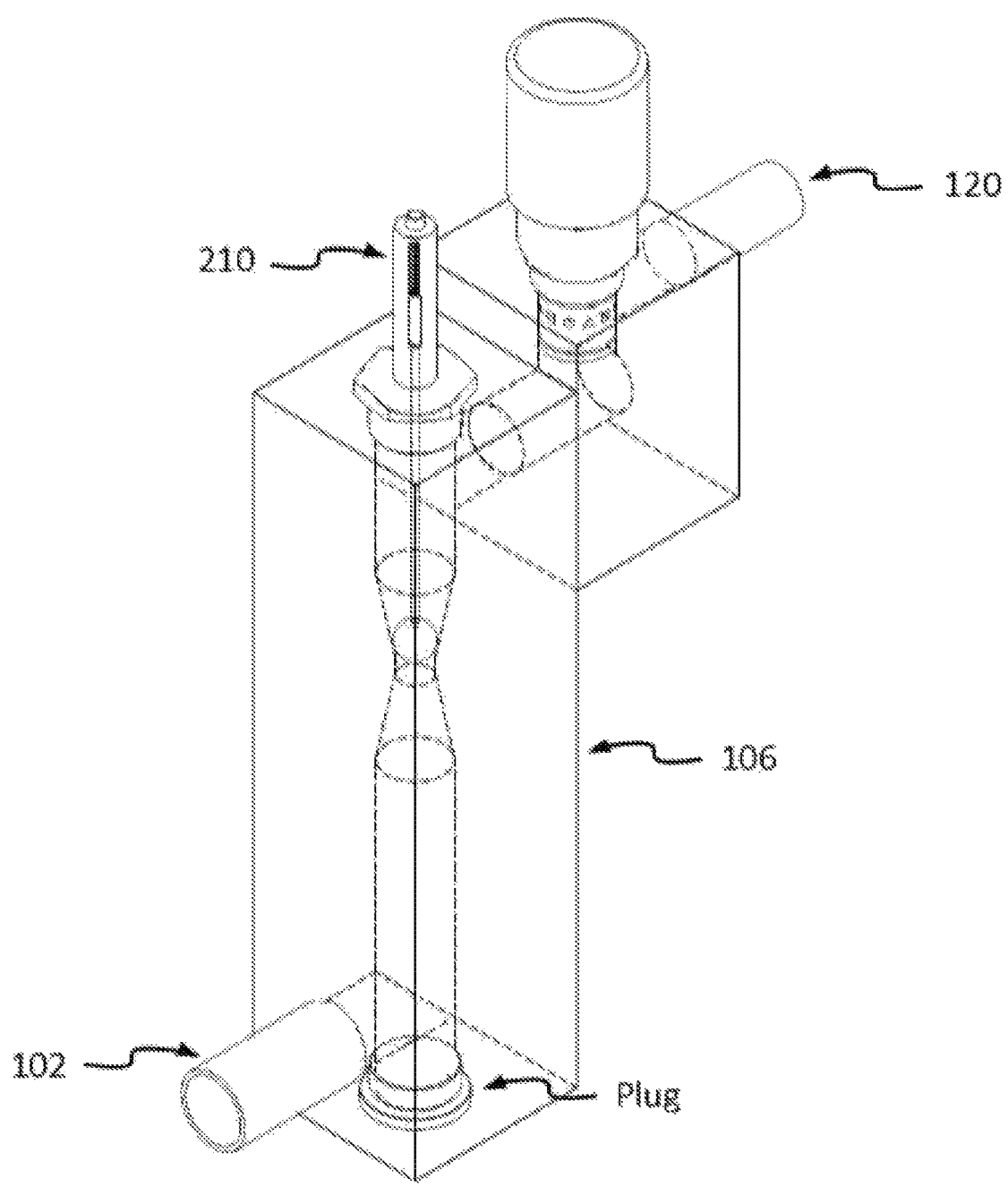
FIG. 19 is a perspective view of a flow control valve assembly according to another embodiment of the present invention shown in use with the float assembly of FIG. 14.
Figure 20:
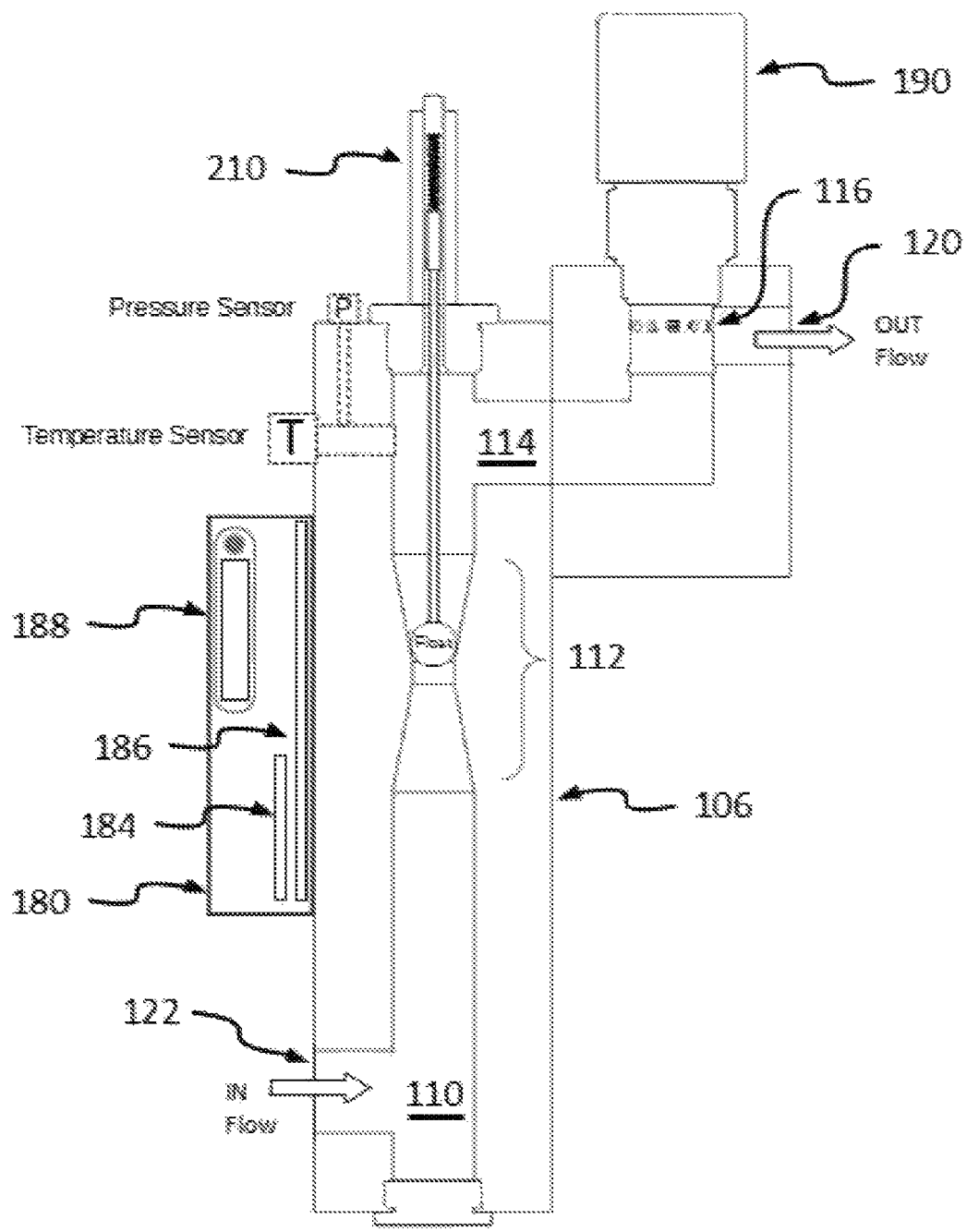
FIG. 20 is a cross-sectional side view of the assembly of FIG. 19.

FIGS. 19-20 illustrate a flow control valve assembly according to another embodiment of the present invention shown in use with the float assembly of FIG. 14. FIGS. 19 and 20 correspond to FIGS. 1B and 2, respectively, and the same numerals in FIGS. 19 and 20 that are found in FIGS. 1B and 2 are intended to designate the same elements. As a result, the elements described in detail in connection with FIGS. 1B and 2 above will not be described in detail for FIGS. 19 and 20 except in the context of FIGS. 19 and 20 to describe the differences between the respective embodiments.

There are two major differences between the embodiments shown in FIGS. 19-20 and FIGS. 1B and 2. First, the mounting brackets 130 and 132 have been replaced so that the flow path from the inlet chamber 110 to the variable area chamber 112 in the flow control manifold 106 has been simplified and does not contain any electrical cables or wiring. This is because the mounting of the float assembly 210 is now positioned at the top of the assembly, outside the various manifolds, so that there is no longer any mounting bracket inside the fluid flow path. Second, the outflow path of the valve assembly (i.e., solenoid 190, valve spool 118, valve sleeve 116 and outlet flow port 120) has been positioned to one side away from the top of the variable area chamber 112 so that the fitting 204 can be mounted directly above the variable area chamber 112, and the connecting rod 140 can extend vertically from the fitting 204 into the variable area chamber 112 where the float 142 can be seated on top of the neck region 162.

Figure 21:
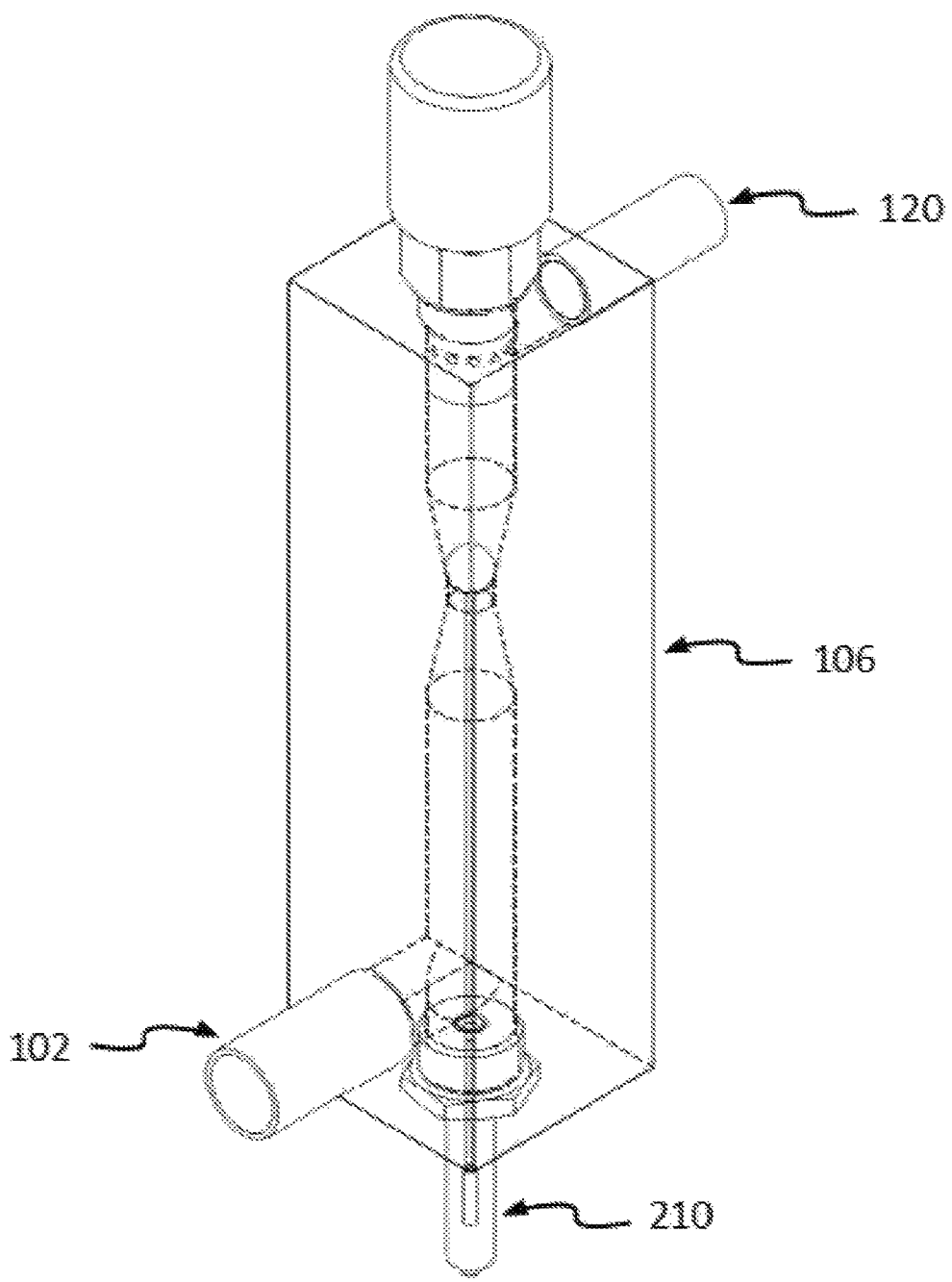
FIG. 21 is a perspective view of a flow control valve assembly according to yet another embodiment of the present invention shown in use with the float assembly of FIG. 14.
Figure 22:
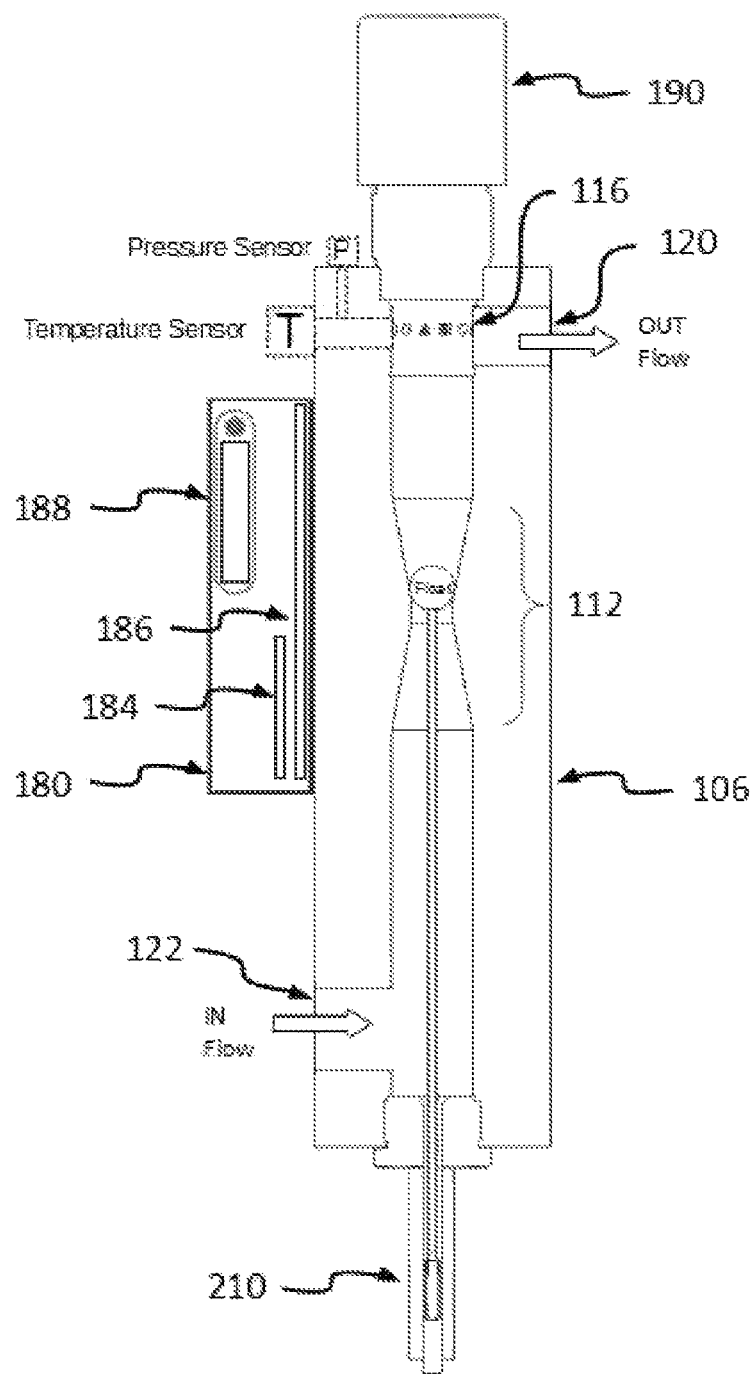
FIG. 22 is a cross-sectional side view of the assembly of FIG. 21.

FIGS. 21-22 illustrate a flow control valve assembly according to yet another embodiment of the present invention shown in use with the float assembly of FIG. 14. FIGS. 21 and 22 correspond to FIGS. 1B and 2, respectively, and the same numerals in FIGS. 19 and 20 that are found in FIGS. 1B and 2 are intended to designate the same elements. As a result, the elements described in detail in connection with FIGS. 1B and 2 above will not be described in detail for FIGS. 21 and 22 except in the context of FIGS. 21 and 22 to describe the differences between the respective embodiments.

The embodiment shown in FIGS. 21 and 22 is actually based on the embodiment of FIGS. 19 and 20, except that the same float assembly 210 is mounted at the bottom instead of at the top of the flow control manifold 106. Thus, the outflow path of the valve assembly (i.e., solenoid 190, valve spool 118, valve sleeve 116 and outlet flow port 120) can be same as in FIGS. 1B and 2, but the fitting 204 is now mounted to the bottom of the flow control manifold 106 so that the connecting rod 140 now extends vertically upwardly from the fitting 204 through the inlet chamber 110 into the variable area chamber 112, and through the neck region 162, where the float 142 can be seated on top of the neck region 162. Again, the mounting brackets 130 and 132 have been replaced so that the flow path from the inlet chamber 110 to the variable area chamber 112 in the flow control manifold 106 has been simplified and does not contain any electrical cables or wiring. The mounting of the float assembly 210 is now positioned at the bottom of the assembly, outside the various manifolds, so that there is no longer any mounting bracket inside the fluid flow path.

Figure 23A:
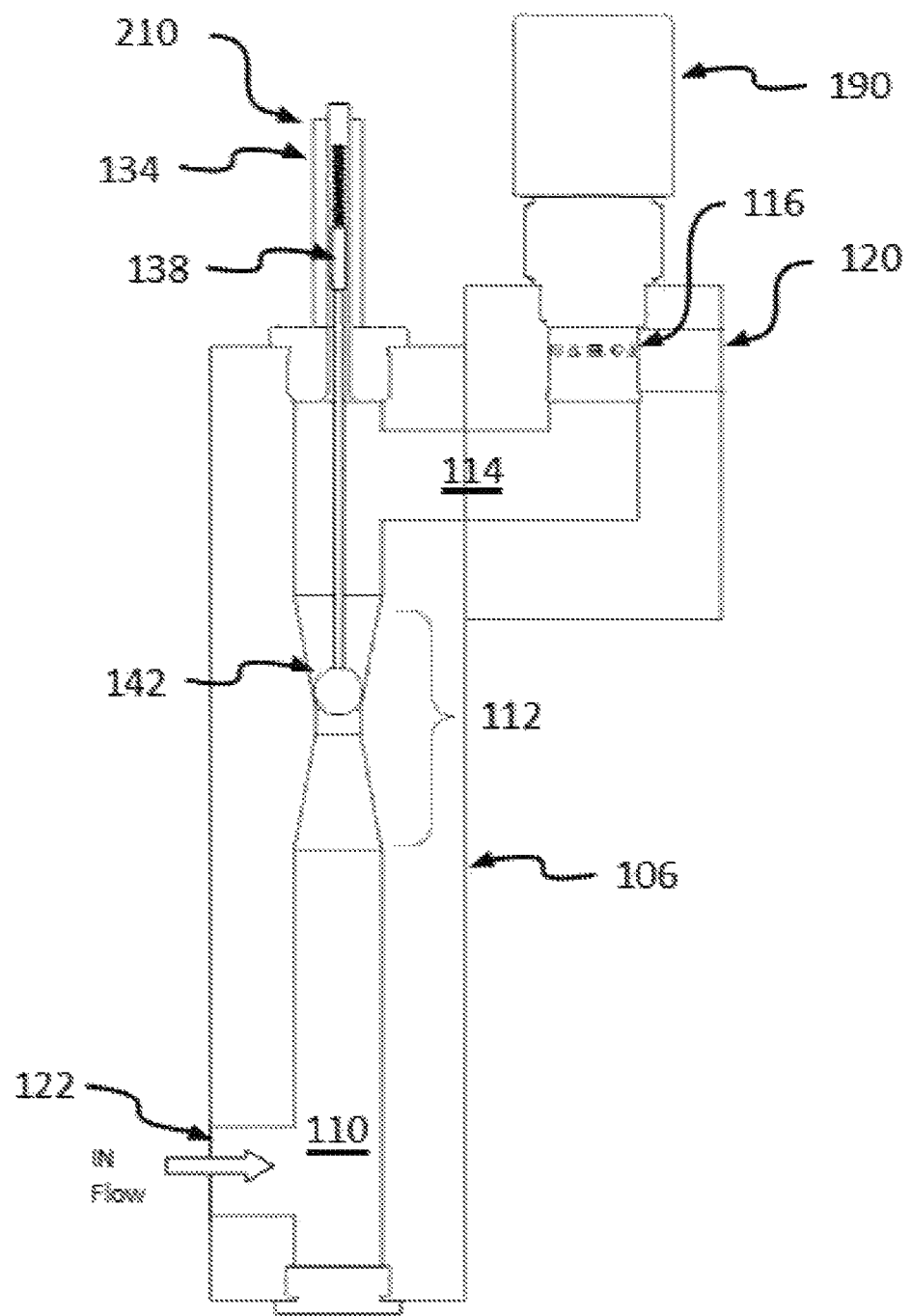
FIG. 23A is a sectional view illustrating the float in a rest position for the embodiment of FIG. 19.
Figure 23B:
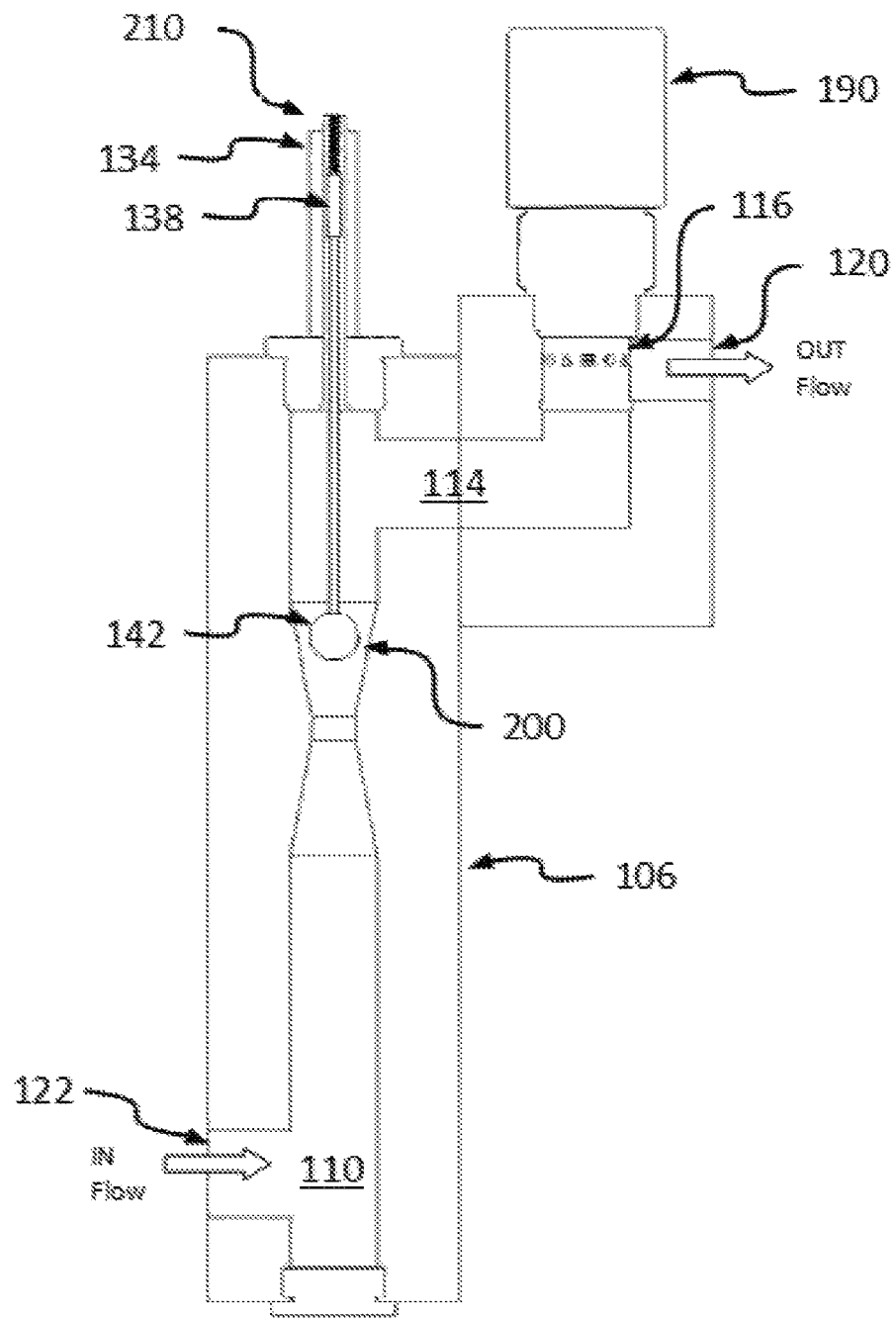
FIG. 23B is a sectional view illustrating the float being displaced from the rest position during fluid flow for the embodiment of FIG. 19.

FIGS. 23A and 23B illustrate the operation for the embodiment FIGS. 19 and 20, and correspond to FIGS. 13A and 13B, respectively. The position of the float 142 is detected by the LVDT 134 in the form of its actual displacement from its rest position (see FIG. 23A) which is a reference point, and then the LVDT 134 calculates the flow opening area 200 or variable orifice area (see FIG. 23B), which is actually the circumferential space between the tapered wall and the ball of the float 142. The position of the float 142, measured by the LVDT 134, defines the flowrate. The measurements and calculations are the same as described above in connection with FIGS. 13A and 13B.

Figure 24:
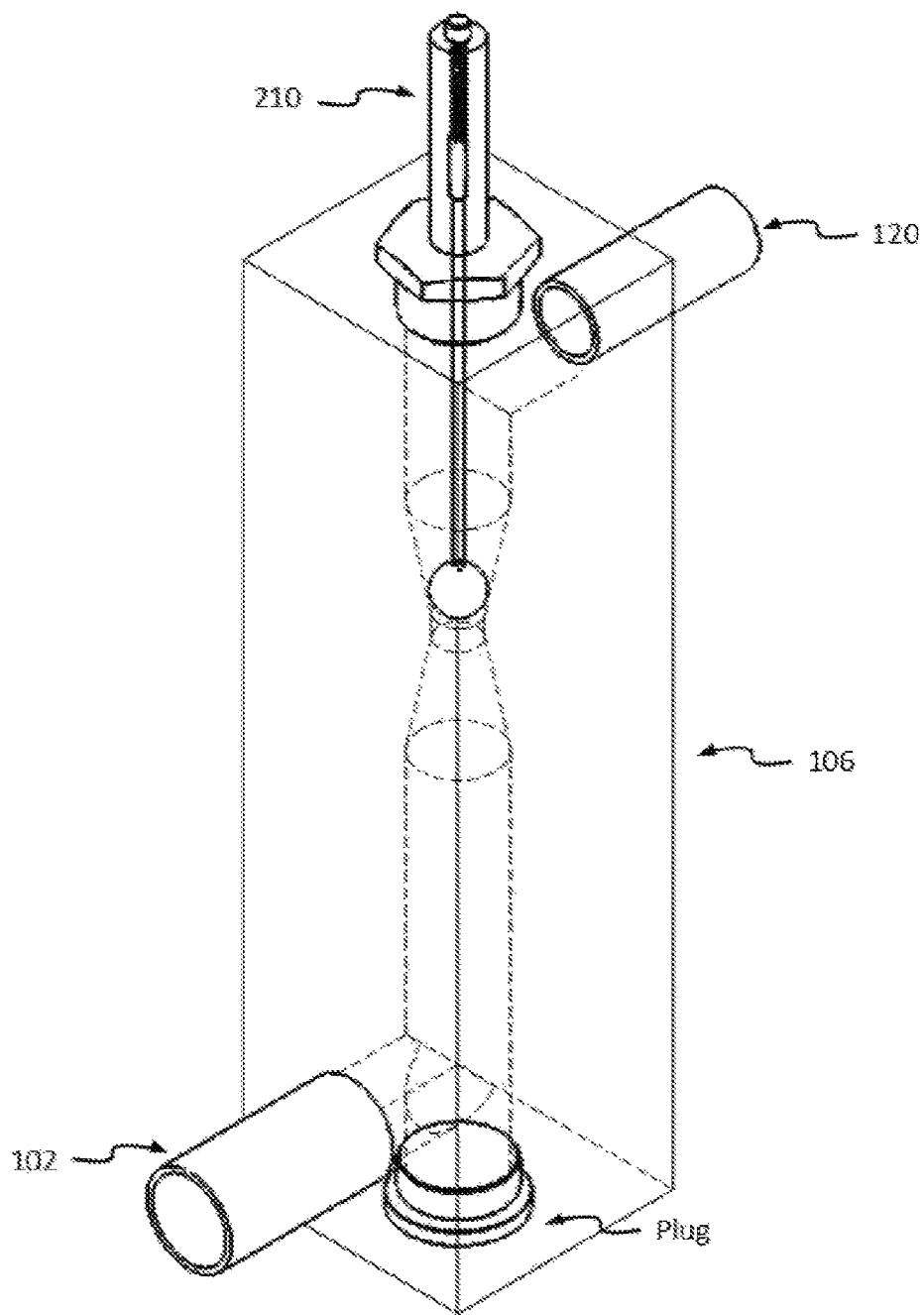
FIG. 24 is a perspective view of a flow sensor assembly showing modifications made to the embodiment of FIG. 19.
Figure 25:
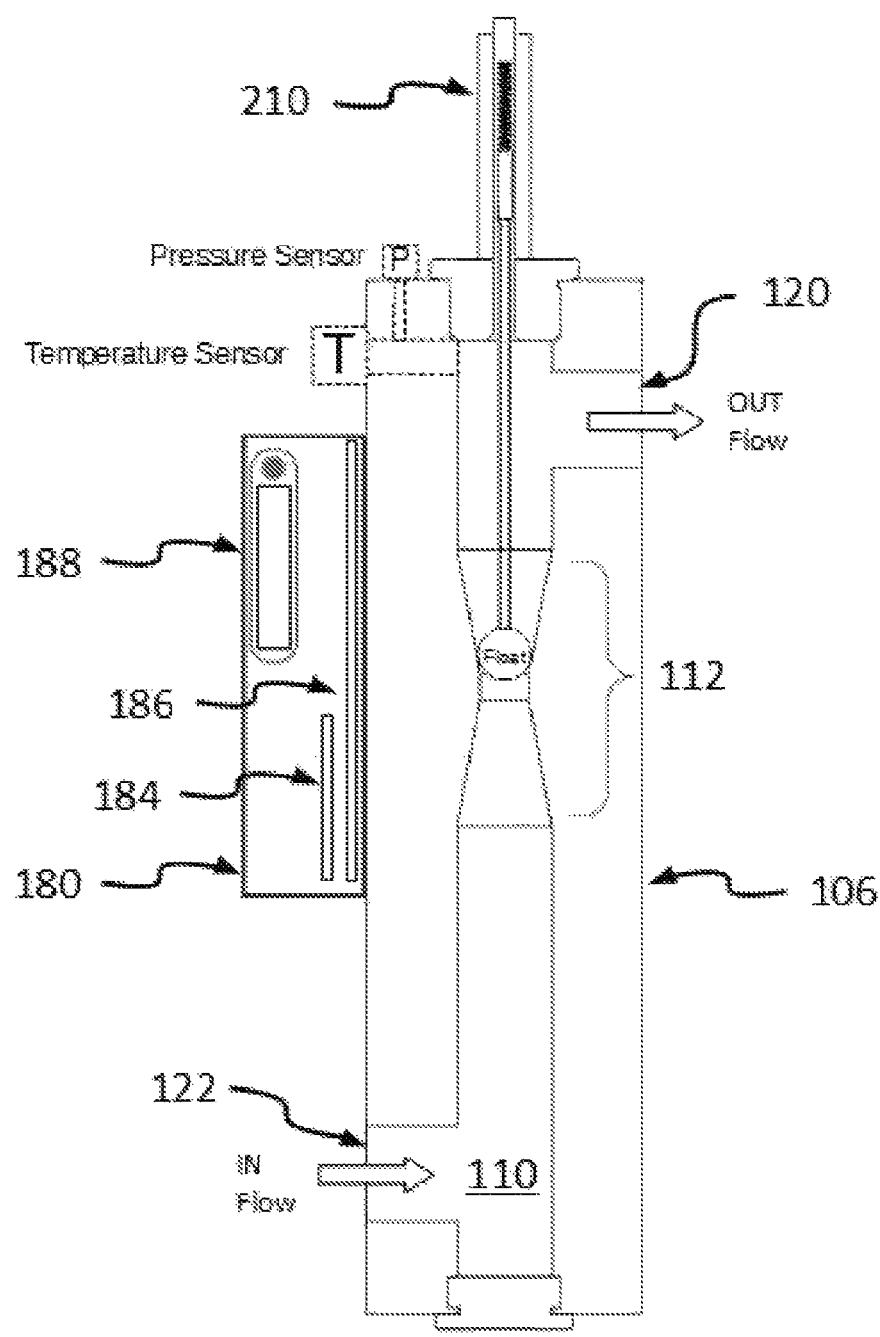
FIG. 25 is a cross-sectional side view of the assembly of FIG. 24.

FIGS. 24 and 25 illustrate a modification that can be made to the embodiment of FIGS. 19 and 20. FIGS. 24 and 25 correspond to FIGS. 19 and 20, respectively, and illustrate a flow sensor embodiment where the valve assembly is omitted. Otherwise, all the elements shown in FIGS. 19 and 20 are also present in FIGS. 24 and 25, and the operation for both embodiments are the same.

Figure 26:
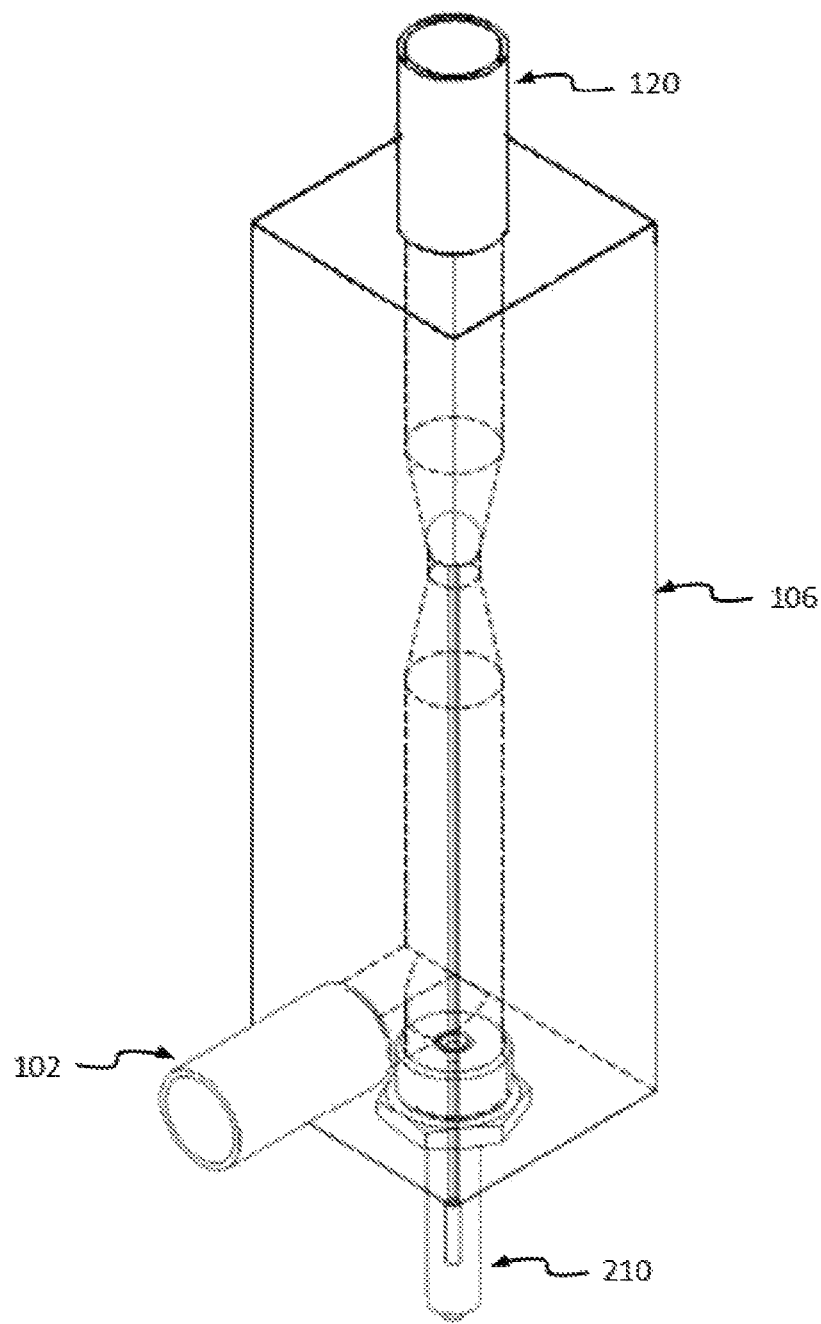
FIG. 26 is a perspective view of a flow sensor assembly showing modifications made to the embodiment of FIG. 21.
Figure 27:
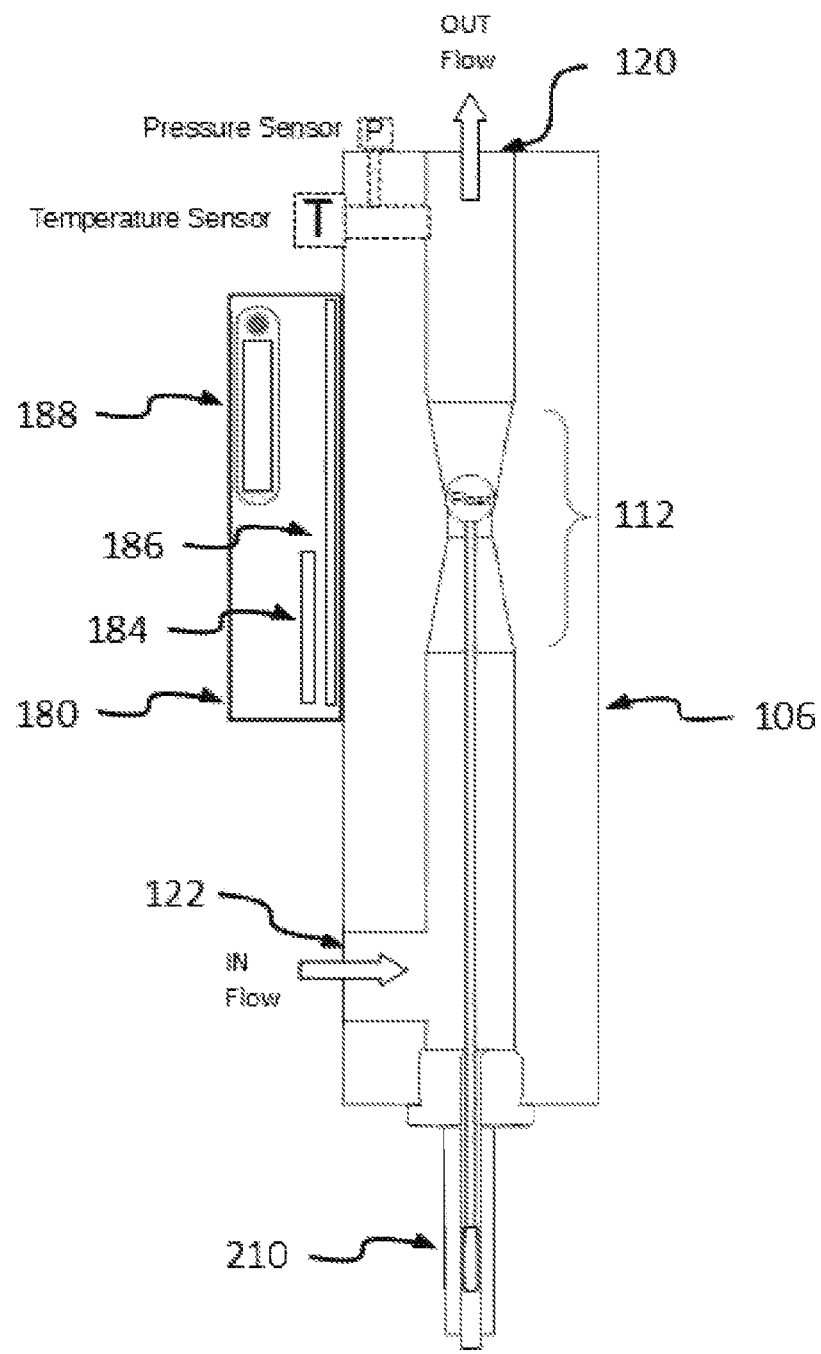
FIG. 27 is a cross-sectional side view of the assembly of FIG. 22.

Similarly, FIGS. 26 and 27 illustrate a modification that can be made to the embodiment of FIGS. 21 and 22. FIGS. 26 and 27 correspond to FIGS. 21 and 22, respectively, and illustrate a flow sensor embodiment where the valve assembly is omitted. Otherwise, all the elements shown in FIGS. 21 and 22 are also present in FIGS. 26 and 27, and the operation for both embodiments are the same.

Figure 28:
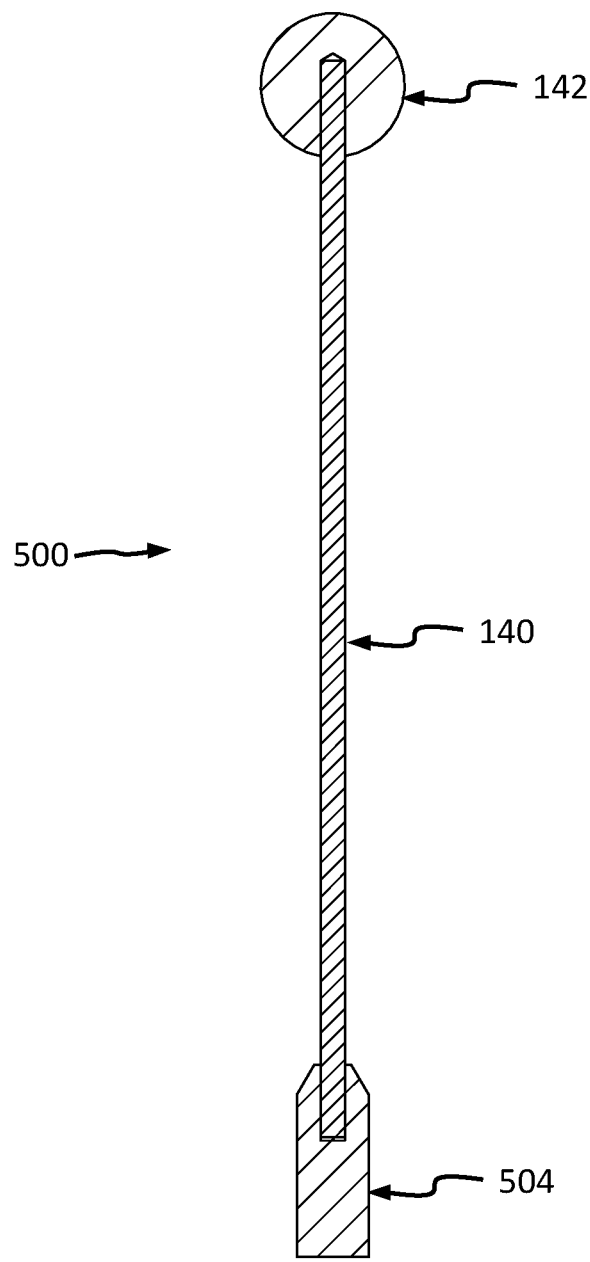
FIG. 28 is a perspective cross sectional view of a float assembly according to yet another embodiment of the present invention.

FIG. 28 illustrates a float assembly 500 according to another embodiment of the present invention. All the float assemblies 128, 210 and 500 perform the same function of measuring the displacement of the float, but the float assembly 500 has a simpler construction that uses a Hall Effect sensor 502 (see FIGS. 29 and 30) as the measurement device, and also isolates the Hall Effect sensor 502 from the fluid pressure and the fluid flow.

The float assembly 500 includes a float 142 that is connected to a first upper end of a connecting rod 140, and a magnet 504 that is connected to a second opposite lower end of the connecting rod 140. The connecting rod 140 and the float 142 can be the same as the connecting rod 140 and the float 142 in the earlier embodiments above.

Figure 29:
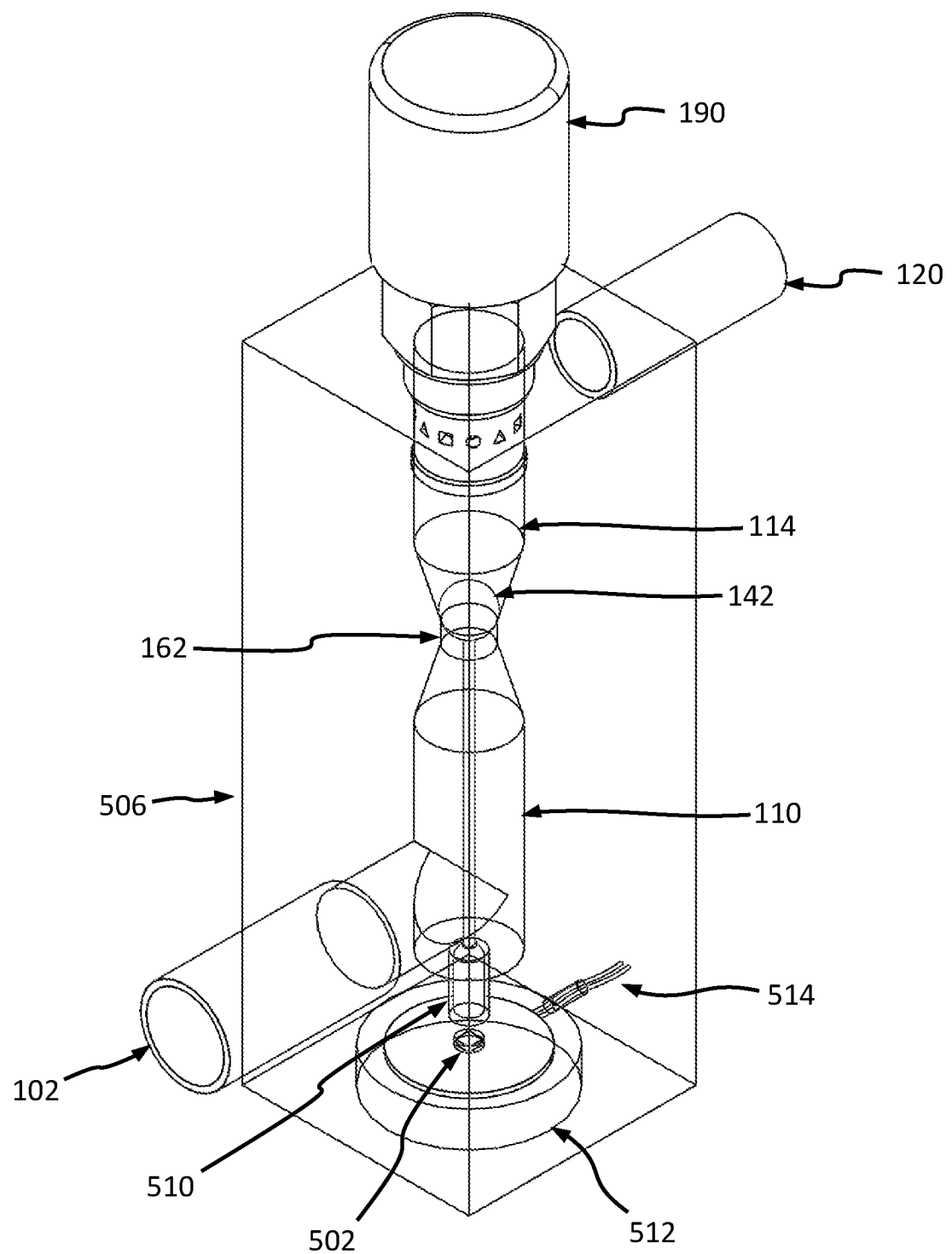
FIG. 29 is a perspective view of a flow control valve assembly according to another embodiment of the present invention shown in use with the float assembly of FIG. 28.
Figure 30:
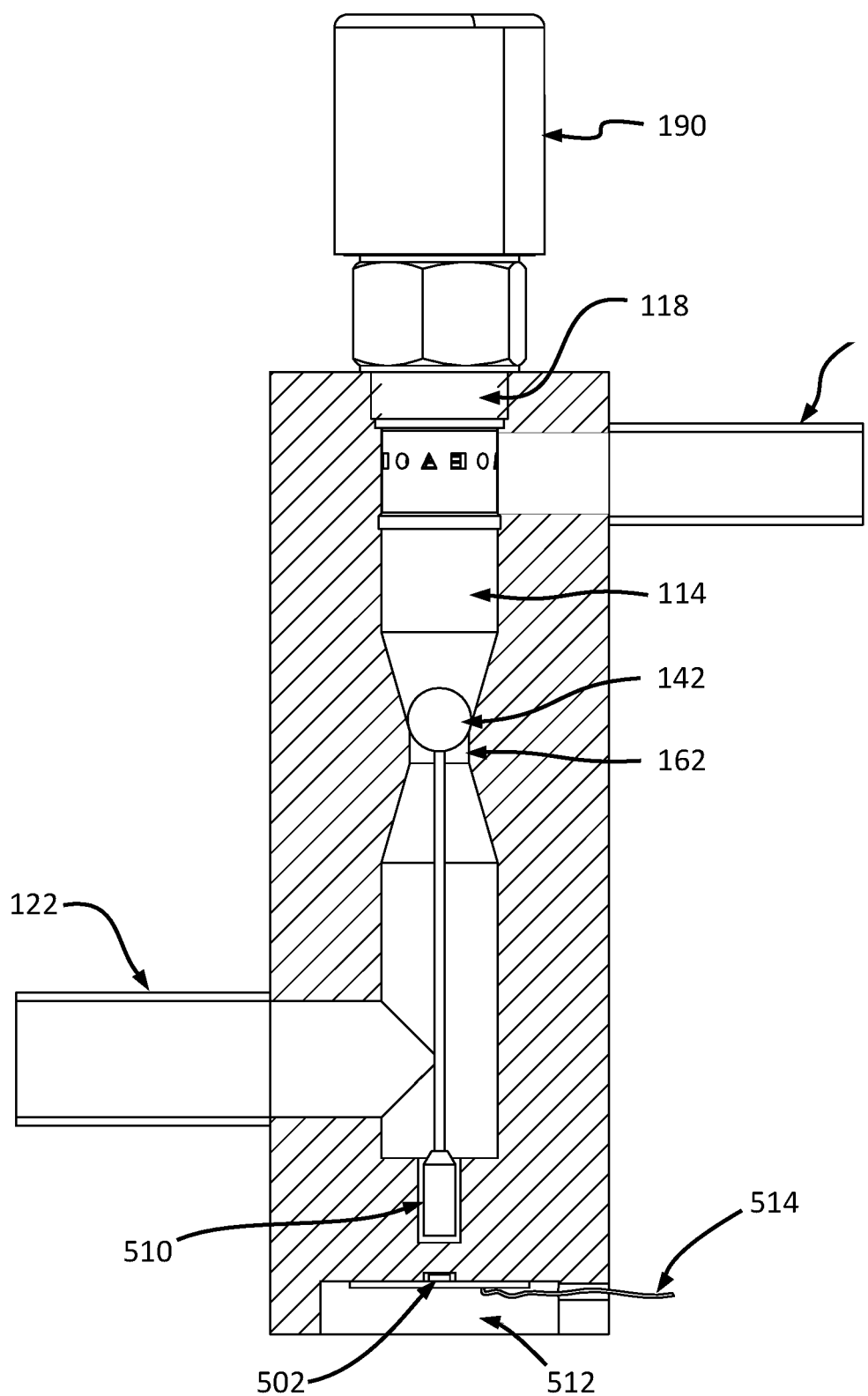
FIG. 30 is a cross-sectional side view of the assembly of FIG. 29.

FIGS. 29-30 illustrate a flow control valve assembly according to another embodiment of the present invention shown in use with the float assembly of FIG. 28. FIGS. 29 and 30 correspond to FIGS. 1B and 2, respectively, and the same numerals in FIGS. 29 and 30 that are found in FIGS. 1B and 2 are intended to designate the same elements. As a result, the elements described in detail in connection with FIGS. 1B and 2 above will not be described in detail for FIGS. 29 and 30 except in the context of FIGS. 29 and 30 to describe the differences between the respective embodiments.

In FIGS. 29-30, a manifold 506 is essentially the same as the feedback manifold 105 and the flow control manifold 106 combined. The flow path defined by the chambers 110, 112 and 114 are the same as in FIGS. 1B and 2. Specifically, the inlet flow is delivered via an inlet flow port 122 to the inlet chamber 110, which is in turn fluidly coupled to a variable area chamber (which is the same as 112 in FIGS. 1B and 2), and then the variable area chamber is fluidly coupled to an outlet chamber 114. A valve sleeve 116 and a matching valve spool 118 are seated inside the outlet chamber 114 to control the flow of the outflowing fluid. An outlet flow port 120 is fluidly coupled to the outlet chamber 114 through the valve spool 118 and a valve sleeve (which is the same as 116 in FIGS. 1B and 2) to allow the fluid to flow to the outflow path.

The float assembly 500 is positioned inside the chambers 110 and 112. Specifically, the bottom of the inlet chamber 110 has an elongated section 510 that extends into the body of the manifold 506 towards the bottom of the manifold 506. The float 140 is seated on top of the neck region 162. The connecting rod 140 extends through the neck region 16, and the magnet 504 can be housed inside the section 510 section 510 in its rest position when the flow control valve assembly is not in use. The section 510 can be a housing that can be made from a non-magnetic material such as stainless steel tubing.

The Hall Effect sensor 502 is secured to a control board 512 that is positioned at the bottom of the manifold 506. The Hall Effect sensor 502 is spaced apart from the bottom of the magnet 504 by a small distance. The material of the manifold 506 is a non-magnetic material so as to not interfere with the operation of the Hall Effect sensor's 502 in sensing the position of the magnet 504. Wires 514 can be connected to the control board 512 to power the sensor 502, and to deliver the readings from the sensor 502.

In operation, fluid flow through the neck region 162 will cause the float 142 to displace. The position of the float 142 is detected by the Hall Effect sensor 502 in the form of the actual displacement of the magnet 504 from its rest position, which is a reference point, and then the sensor 502 calculates the flow opening area 200 or variable orifice area (see FIG. 23B), which is actually the circumferential space between the tapered wall and the ball of the float 142. The position of the float 142, measured by the sensor 502, defines the flowrate. The measurements and calculations are the same as described above in connection with FIGS. 13A and 13B.

The embodiment of FIGS. 28-30 provides a few benefits over the previous embodiments. First, by positioning the magnet 504 or magnet in a non-magnetic housing 510 below the fluid flow (away from the flow path) helps to preserve magnet 504 or housing 510 from any abrasive flow path. The sensor 502 is located outside the fluid chamber which is fully protected from the fluid flow and pressure. Second, this embodiment provides an arrangement between the float assembly 500 and the sensor 502 that provides non-contact sensing, which ensures that there will be no leakage of the fluid. Third, the float assembly 500 is very simple in construction, thereby making it easier and cheaper to manufacture.

The above detailed description is for the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices, components, mechanisms and methods are omitted so as to not obscure the description of the present invention with unnecessary detail.

What is claimed is:

1. A flow control valve assembly, comprising:
at least one manifold having a bottom, an inlet flow port, an outlet flow port, and a flow channel provided between the inlet flow port and the outlet flow port, the flow channel having an inlet chamber, a variable area chamber and an outlet chamber, with fluid flowing from the inlet flow port to the inlet chamber, the variable area chamber and the outlet chamber, in that order, before exiting the outlet flow port;
a float assembly having a float extending through the flow channel and which is limited for its movement inside the variable area chamber, a connecting rod extending through the flow channel and which has an upper end that is connected to the float and a lower end that is connected to a magnet; and
a measuring device positioned at the bottom of the at least one manifold, and spaced apart from the magnet.

2. The assembly of claim 1, wherein the measuring device is a Hall Effect sensor.

3. The assembly of claim 1, wherein the variable area chamber has a tapered inflow section, a neck region, and a tapered outflow section, wherein the tapered inflow section starts with its largest diameter at its inflow end where the fluid flow enters the variable area chamber and then gradually tapers to its smallest diameter where it transitions to the neck region, and then the variable area chamber transitions from the neck region to the tapered outflow section which starts with its smallest diameter at the transition from the neck region and gradually tapers to its largest diameter adjacent the transition to the outlet chamber.

4. The assembly of claim 3, wherein the float is always retained inside the tapered outflow section and is seated against the neck region in a rest position when there is no fluid flow through the flow channel.

5. The assembly of claim 1, wherein the outlet chamber is adapted to receive a valve spool and a valve sleeve or a generic flow control valve.

6. The assembly of claim 1, further including pressure and temperature sensors.

7. The assembly of claim 1, wherein the inlet flow port comprises multiple inlet ports.

8. The assembly of claim 1, further including an electronic enclosure which includes a signal conditioner circuit board and a main controller and driver circuit board housed therein.

9. The assembly of claim 1, wherein the magnet is housed inside a non-magnetic housing that is positioned adjacent and spaced-apart from the measuring device, with the magnet positioned in a rest position when there is no flow of fluid through the flow channel.

10. The assembly of claim 1, wherein the measuring device measures the actual displacement of the magnet from the rest position, and based on the actual displacement, the calculated flow opening area and the fluid velocity at the area around the float can be used to determine the flowrate.

* * * * *